(12) United States Patent
Cheung et al.

(10) Patent No.: US 11,476,891 B2
(45) Date of Patent: Oct. 18, 2022

(54) FREQUENCY NONLINEARITY CALIBRATION IN FREQUENCY-MODULATED CONTINUOUS WAVE RADAR

(71) Applicant: Futurewei Technologies, Inc., Plano, TX (US)

(72) Inventors: Ricky Lap Kei Cheung, San Diego, CA (US); Luzhou Xu, Santa Clara, CA (US); Lixi Wu, San Diego, CA (US); Hsing Kuo Lo, San Diego, CA (US); Yuan Su, Santa Clara, CA (US)

(73) Assignee: Futurewei Technologies, Inc., Dallas, TX (US)

( * ) Notice: Subject to any disclaimer, the term of this patent is extended or adjusted under 35 U.S.C. 154(b) by 9 days.

(21) Appl. No.: 16/820,626

(22) Filed: Mar. 16, 2020

(65) Prior Publication Data

US 2020/0287587 A1 Sep. 10, 2020

Related U.S. Application Data

(63) Continuation of application No. 15/493,751, filed on Apr. 21, 2017, now Pat. No. 10,594,358.

(51) Int. Cl.
*H04B 1/525* (2015.01)
*G01S 7/02* (2006.01)
(Continued)

(52) U.S. Cl.
CPC ............ *H04B 1/525* (2013.01); *G01S 7/02* (2013.01); *G01S 7/35* (2013.01); *G01S 7/352* (2013.01);
(Continued)

(58) Field of Classification Search
None
See application file for complete search history.

(56) References Cited

U.S. PATENT DOCUMENTS 4,544,926 A 10/1985 Giuli
5,229,774 A * 7/1993 Komatsu ............... G01S 7/023
342/70
(Continued)

FOREIGN PATENT DOCUMENTS

CN 1342908 A 4/2002
CN 1780165 A 5/2006
(Continued)

OTHER PUBLICATIONS

K. Lin, R. H. Messerian and Yuanxun Wang, "A digital leakage cancellation scheme for monostatic FMCW radar," 2004 IEEE MTT-S International Microwave Symposium Digest (IEEE Cat. No.04CH37535), 2004, pp. 747-750 vol. 2, doi: 10.1109/MWSYM.2004.1339068. (Year: 2004).*
(Continued)

*Primary Examiner* — Bernarr E Gregory
(74) *Attorney, Agent, or Firm* — James Anderson Harrison

(57) ABSTRACT

Various embodiments include methods and systems having detection apparatus operable to cancel or reduce leakage signal originating from a source signal being generated and transmitted from a transmitter. A leakage cancellation signal can be generated digitally, converted to an analog signal, and then subtracted in the analog domain from a received signal to provide a leakage-reduced signal for use in detection and analysis of objects. A digital cancellation signal may be generated by generating a cancellation signal in the frequency domain and converting it to the time domain. Optionally, an estimate of a residual leakage signal can be generated and applied to reduce residual leakage remaining
(Continued)

in the leakage-reduced signal. Additional apparatus, systems, and methods can be implemented in a variety of applications.

9 Claims, 9 Drawing Sheets

(51) Int. Cl.
*G01S 7/35* (2006.01)
*G01S 7/52* (2006.01)
*H04B 1/12* (2006.01)
*H04B 1/44* (2006.01)
*G01S 13/34* (2006.01)

(52) U.S. Cl.
CPC .............. *G01S 7/354* (2013.01); *G01S 7/52* (2013.01); *G01S 7/5203* (2013.01); *G01S 7/52023* (2013.01); *G01S 7/52031* (2013.01); *H04B 1/123* (2013.01); *H04B 1/44* (2013.01); *G01S 13/341* (2013.01)

(56) References Cited

U.S. PATENT DOCUMENTS

| | | | |
|---|---|---|---|
| 5,444,864 | A | 8/1995 | Smith |
| 5,469,167 | A | 11/1995 | Polge et al. |
| 5,861,837 | A | 1/1999 | Richardson et al. |
| 5,969,667 | A | 10/1999 | Farmer et al. |
| 6,198,416 | B1 | 3/2001 | Velazquez |
| 6,567,649 | B2 | 5/2003 | Souissi |
| 7,202,812 | B2 | 4/2007 | Krikorian et al. |
| 7,876,867 | B2 | 1/2011 | Filipovic et al. |
| 8,175,535 | B2 | 5/2012 | Mu |
| 8,290,100 | B2 | 10/2012 | Komninakis et al. |
| 8,706,055 | B2 | 4/2014 | Aparin |
| 9,448,301 | B2 | 9/2016 | Abbasi et al. |
| 9,503,112 | B1 | 11/2016 | Zanbaghi et al. |
| 10,422,856 | B2 | 9/2019 | Cheung et al. |
| 10,594,358 | B2 * | 3/2020 | Cheung .................. G01S 7/354 |
| 2008/0242245 | A1 * | 10/2008 | Aparin .................. H04B 1/525 455/126 |
| 2009/0086864 | A1 | 4/2009 | Komninakis et al. |
| 2009/0251361 | A1 | 10/2009 | Beasley |
| 2011/0002428 | A1 | 1/2011 | Erickson |
| 2011/0095819 | A1 | 4/2011 | Velazquez |
| 2012/0112956 | A1 | 5/2012 | Trotta et al. |
| 2012/0306673 | A1 | 12/2012 | Ueno |
| 2014/0028491 | A1 | 1/2014 | Ferguson |
| 2014/0313071 | A1 | 10/2014 | Mccorkle |
| 2015/0036773 | A1 | 2/2015 | Lakkis |
| 2015/0084811 | A1 | 3/2015 | Mazzaro et al. |
| 2015/0177371 | A1 | 6/2015 | Abbasi et al. |
| 2015/0378017 | A1 | 12/2015 | Ferguson et al. |
| 2016/0134314 | A1 | 5/2016 | Yang et al. |
| 2017/0163356 | A1 | 6/2017 | Chen |
| 2018/0329031 | A1 | 11/2018 | Cheung et al. |

FOREIGN PATENT DOCUMENTS

| | | | | |
|---|---|---|---|---|
| CN | 101502007 | A | 8/2009 | |
| CN | 101518056 | A | 8/2009 | |
| CN | 101946416 | A | 1/2011 | |
| CN | 101971506 | A | 2/2011 | |
| CN | 102253378 | A | 11/2011 | |
| CN | 102393512 | A | 3/2012 | |
| CN | 102662163 | A | 9/2012 | |
| CN | 103078640 | A | 5/2013 | |
| CN | 103454618 | A | 12/2013 | |
| CN | 103580715 | A | 2/2014 | |
| CN | 104009776 | A | 8/2014 | |
| CN | 104297738 | A | 1/2015 | |
| CN | 104569930 | A | 4/2015 | |
| CN | 104777478 | A | 7/2015 | |
| CN | 105319544 | A | 2/2016 | |
| CN | 106125052 | A | 11/2016 | |
| CN | 103760541 | B | * 2/2017 | .............. G01S 7/41 |
| CN | 106443658 | A | 2/2017 | |
| CN | 106464754 | B | 8/2019 | |
| EP | 0654679 | A1 | 5/1995 | |
| EP | 1886163 | B1 | 10/2008 | |
| EP | 2814184 | A1 | 12/2014 | |
| EP | 2960672 | A1 | 12/2015 | |
| JP | S58174874 | A | 10/1983 | |
| JP | 2005181147 | A | 7/2005 | |
| JP | 2012093312 | A | 5/2012 | |
| KR | 1020120135750 | A | * 12/2012 | .............. G01S 13/34 |
| WO | 2002017506 | A1 | 2/2002 | |
| WO | 2008118806 | A1 | 10/2008 | |
| WO | 2009106515 | A1 | 9/2009 | |

OTHER PUBLICATIONS

Ma Jinguang, Design of Digital Pre-Distortion Hardware Platform. Beijing University of Posts and Telecommunications, 2015, 1 page.
Andreas Frotzscher et al., Tx Leakage Impact on Analog-Digital Conversion in Zero-IF Receivers. 2009 IEEE 70th Vehicular Technology Conference Fall, Sep. 20-23, 2009, 5 pages.
K. Lin, R. H. Messerian, Y. Wang, et al, A Ka-Band FMCW Radar Front-End With Adaptive Leakage Cancellation , IEEE Transactions on Microwave Theory and Techniques, vol. 54, No. 12, pp. 4041-4048, Dec. 2006.
K. Lin, R. H. Messerian, Y. Wang, A Digital Leakage Cancellation Scheme for Monostatic FMCW Radar , IEEE MTT-S International Microwave Symposium Digest, Jun. 2004. pp. 747-750.
A. Melzer, A. Onic, F. Starzer, et al, Short-Range Leakage Cancelation in FMCW Radar Transceivers Using an Artificial On-Chip Target , IEEE Journal on Selected Topics in Signal Processing, vol. 9, No. 8, pp. 1650-1660, Dec. 2015.
C. Y.Kim, J. G. Kim, J. H. Oum, et al, Tx leakage cancellers for 24 GHz and 77 GHz vehicular radar applications , IEEE MTT-S International Microwave Symposium Digest, Jun. 2006. pp. 1-4.
J. Lien, N. Gillian, M. E. Karagozler, et al, Soli: Ubiquitous Gesture Sensing with Millimeter Wave Radar , ACM Transactions on Graphics (TOG), vol. 35 Issue 4, Jul. 2016. 19pgs.
H.H. Meinel, Evolving Automotive Radar—from the very beginnings into the future , The 8th European Conference on Antennas and Propagation (EuCAP2014), 2014. pp. 3107-3114.
Kaihui Lin et al., "Transmitter Noise Cancellation in Monostatic FMCW Radar"; published in 2006 IEEE MTT-S International Microwave Symposium Digest; pp. 1406-1409; published by IEEE, Piscataway, New Jersey, USA; published in the year 2006. (Year: 2006).
Yuan-Pei Lin et al, Windowed multicarrier systems with minimum spectral leakage, 2004 IEEE International Conference on Acoustics, Speech, and Signal Processing, 4 pages.
Wen Yumei et al. Leak detection and accurate location in the presence of fixed source of interference. 2013, 5 pages.
D. Genschow, "FMCW radar ramp leakage compensation via closed loop DC correction," 2014 11th European Radar Conference, 2014, pp. 459-462.

\* cited by examiner

FREQUENCY NONLINEARITY CALIBRATION IN FREQUENCY-MODULATED CONTINUOUS WAVE RADAR

CROSS-REFERENCE TO RELATED APPLICATIONS

This application is a continuation of U.S. application Ser. No. 14/493,751, filed on Apr. 21, 2017, now U.S. Pat. No. 10,594,358, which application is hereby incorporated in its entirety.

FIELD OF THE INVENTION

The present disclosure is related to sensing technologies.

BACKGROUND

A radar system transmits a signal and receives its echo. By processing the echo signal, the radar system is able to detect objects, and to estimate the distances, velocities, and directions associated with the objects. Historically, a pulsed radar is used in military applications, where targets of interest are typically far away from the radar system. The pulsed radar emits short pulses, and in the silent period receives the echo signals. The transmitter of the pulsed radar system is turned off before the measurement starts. However, in many civilian applications, such as automotive radar, wireless gesture recognition, vital sign monitoring, and other monitoring implementations, the objects of interest are usually close to the radar. Due to the short round-trip-delay (RTD) of the desired reflection signal, a pulsed radar doesn't work as well at close range. Instead of a pulsed radar, a frequency-modulated continuous wave or waveform (FMCW) radar is used for short distances.

In FMCW radar, the transmission signal is modulated in frequency (or in phase) and differences in phase or frequency between the transmitted signal and a received signal are used to measure distance to the object from which the transmitted signal is reflected. A linear frequency modulated (LFM) waveform can be used, whose instantaneous frequency linearly increases or decreases over time. With the change in frequency being linear over a wide range, then the distance can be determined by a frequency comparison, with the frequency difference being proportional to the distance.

FIG. 1 is a block diagram of a typical FMCW radar. A waveform generator 102 generates a radar probing waveform, such as a LFM waveform (i.e., chirp). The generated waveform is amplified by a power amplifier (PA) 103, and then transmitted from the transmitter antenna 104 repeatedly and periodically. At the same time, the signal received by the receiver antenna 114 is first amplified by a low-noise amplifier (LNA) 113, and then mixed at mixer 106 with a replica of the transmitted waveform. A low-pass filter (LPF) 107 and a digital-to-analog (ADC) 112 are then applied to the output of mixer 106.

When LFM is used, the signal reflected from an object can be modeled as a sinusoid at the mixer output, whose frequency is proportional to the RTD. An ideal waveform for transmission in a FMCW radar can be taken to be a signal, s(t):

$$s(t)=e^{j2\pi(f_c t+0.5\gamma t^2)}, \quad (1)$$

with $f_c$ and $\gamma$ being the center frequency for the waveform and the chirp rate, respectively. A chirp, which can be referred to as a sweep signal, is a signal in which the frequency increases or decreases with time. The chirp rate is the rate of change in the chirp. The instantaneous frequency for s(t) is given as $f_c+\gamma t$, linearly increasing over time t. The received signal, as a reflected signal from an object to which the transmitted signal is incident, can be modeled as x(y):

$$x(t)=\beta s(t-\tau)=\beta e^{j2\pi(f_c(t-\tau)+0.5\gamma(t-\tau)^2)}, \quad (2)$$

with β and τ being amplitude and delay, respectively. The signals s(t) and x(t) can be combined at mixer 106, for example, having output, y(t):

$$y(t)=x^*(t)s(t)=\beta e^{j2\pi(f_c\tau-0.5\gamma\tau^2)}e^{j2\pi\gamma\tau t}, \quad (3)$$

which is a sinusoid over t. By applying a fast Fourier transform (FFT) to the output of ADC 112, for example, the object can be detected, the associated delay τ can be estimated, and an associated distance to the object can be generated.

In operation, a FMCW radar repeats transmission of the LFM waveform continuously or with a small gap between periods. Therefore, in FMCW radar, the transmitter and receiver operate concurrently. Because of this concurrent operation, the transmitted signal can leak into the receive channel from the transmitter (Tx) antenna to the receiver (Rx) antenna directly (without reflection), or even within the radio frequency (RF) circuit. This Tx-to-Rx leakage signal can be much stronger than the desired reflection signal, and can cause severe problems. First, it can generate "ghost" targets, which cause false detections. In such cases, the leakage signal acts as a representation that the transmitted probe had been reflected from an object. Since this is a detection of a leakage signal, the detected signal is not provided by an actual object, hence the detection is from a "ghost" target. Second, it can mask true targets, causing missing detection. Even worse, it can saturate components of the receiver, such as an analog-to-digital converter (ADC), and totally disable the radar system.

Therefore, it is a critical and challenging task to cancel or reduce the Tx-to-Rx leakage in FMCW radar or otherwise account for the Tx-to-Rx leakage. Many methods have been presented in the literature. Some methods perform the Tx-to-Rx leakage cancellation in the analog domain, whose performance is usually limited. A reported method performs leakage cancellation in the digital domain, which, however, cannot solve the receiver saturation problem. Some proposed methods consider a mixed leakage cancellation scheme, which estimates the leakage signal in the digital domain and cancels it in the analog domain. However, in such a mixed leakage cancellation scheme, the leakage cancelation step is carried out at radio frequency (RF) using additional mixers, which scheme increases the complexity and cost of a radar transceiver.

SUMMARY

A system and method comprise generating a leakage cancellation signal in the digital domain and cancelling a leakage signal in receiving a signal in the analog domain based on the leakage cancellation signal generated in the digital domain. A waveform generator generates a source signal for wireless transmission for detection in receive path circuitry of an ingoing signal that is a reflection of the transmitted signal from an object. Receive path circuitry, coupled to receive the ingoing signal corresponding to the transmitted source signal and to process the ingoing signal, include a mixer coupled to receive the source signal, the ingoing signal, and a leakage signal associated with the source signal, where the mixer produces a mixer output signal. An analog-to-digital converter is implemented to produce a digital mixer output signal that is based upon the mixer output signal. Subtraction circuitry is disposed electrically between the mixer and the analog-to-digital converter to subtract a leakage cancellation signal from the mixer output signal. The leakage cancellation is generated by digital processing circuitry that comprises a cancellation signal generator coupled to receive the digital mixer output signal to produce a digital cancellation signal. A digital to analog converter is coupled to receive the digital cancellation signal to produce the leakage cancellation signal.

Various examples are now described to introduce a selection of concepts in a simplified form that are further described below in the detailed description. The Summary is not intended to identify key or essential features of the claimed subject matter, nor is it intended to be used to limit the scope of the claimed subject matter.

According to one aspect of the present disclosure, there is provided a system comprising: a waveform generator to generate a source signal for wireless transmission from at least one antenna; receive path circuitry coupled to receive an ingoing radio frequency (RF) signal to process the ingoing RF signal, the receive path circuitry comprising: a mixer coupled to receive the source signal, the ingoing RF signal, and a leakage signal associated with the source signal, wherein the mixer produces a mixer output signal, an analog-to-digital converter that produces a digital mixer output signal that is based upon the mixer output signal, subtraction circuitry disposed electrically between the mixer and the analog-to-digital converter to subtract a leakage cancellation signal from the mixer output signal, and digital processing circuitry that comprises: a cancellation signal generator coupled to receive the digital mixer output signal to produce a digital cancellation signal, and a digital to analog converter coupled to receive the digital cancellation signal to produce the leakage cancellation signal.

Optionally, in any of the preceding aspects, another implementation of the aspect provides that the system includes a first switch coupled to receive the mixer output signal and coupled to the subtraction circuitry to provide the received mixer output signal to the subtraction circuitry, and a second switch coupled to receive the leakage cancellation signal and coupled to the subtraction circuitry to provide the received leakage cancellation signal to the subtraction circuitry, operation of the first and second switches coordinated to operate the subtraction circuitry in a working mode and in a calibration mode.

Optionally, in any of the preceding aspects, a further implementation of the aspect provides that the system includes a variable gain amplifier coupled between the subtraction circuitry and the analog-to-digital converter, the variable gain amplifier adjustable such that, in the calibration mode, the variable gain amplifier is set to a low-gain relative to a gain setting of the variable gain amplifier in the working mode.

Optionally, in any of the preceding aspects, a further implementation of the aspect provides that the cancellation signal generator includes access to a storage device to store the digital cancellation signal or parameters to generate the digital cancellation signal.

Optionally, in any of the preceding aspects, a further implementation of the aspect provides that the cancellation signal generator includes circuitry to convert a calibration signal, without compensation for signal leakage, to a first frequency domain calibration signal, convert a delta function to a second frequency domain calibration signal, generate a frequency domain leakage cancellation signal from the first and second frequency domain calibration signals, and convert the frequency domain leakage cancellation signal to the digital cancellation signal.

Optionally, in any of the preceding aspects, a further implementation of the aspect provides the system further comprising: residual leakage estimation circuitry coupled to receive the digital mixer output signal to produce a residual leakage estimation, second subtraction circuitry coupled to receive the digital mixer output and the residual leakage estimation to produce a radar output signal, and wherein the subtraction circuitry subtracts the residual leakage estimation from the digital mixer output to produce the radar output signal.

Optionally, in any of the preceding aspects, a further implementation of the aspect provides that the residual leakage estimation circuitry includes the residual leakage estimation circuitry structured to generate a multiplicative factor from an average of the digital mixer output signal over time and to apply the multiplicative factor to the digital mixer output signal to generate the residual leakage estimation Optionally, in any of the preceding aspects, a further implementation of the aspect provides that the system includes circuitry arranged to control a sensing function with respect to the generated source signal, based on the digital mixer output signal or the digital mixer output signal after reduction of a residual leakage estimation from the digital mixer output signal.

Optionally, in any of the preceding aspects, a further implementation of the aspect provides that components of the system are structured to include a frequency-modulated continuous wave radar.

Optionally, in any of the preceding aspects, a further implementation of the aspect provides the system further comprising: one or more additional receive path circuitries identical to the receive path circuitry, one or more additional digital processing circuitries identical to the digital processing circuitry, each of the one or more additional receive path circuitries coupled to a respective one additional receive path circuitry of the additional receive path circuitries, and wherein the receive path circuitry and its associated digital processing circuitry and the one or more additional receive path circuitries and their associated one or more additional digital processing circuitries are structured to operate in parallel with respect the source signal generated by the waveform generator.

Optionally, in any of the preceding aspects, a further implementation of the aspect provides that each digital processing circuitry of the plurality digital processing circuitries comprises: residual leakage estimation circuitry coupled to receive a respective digital mixer output signal to produce a residual leakage estimation in the respective digital processing circuitry, second subtraction circuitry coupled to receive the respective digital mixer output and the residual leakage estimation to produce a radar output signal in the respective digital processing circuitry, and wherein the subtraction circuitry subtracts the residual leakage estimation from the respective digital mixer output to produce the radar output signal.

Optionally, in any of the preceding aspects, a further implementation of the aspect provides that the system further comprises: the at least one antenna being a plurality of transmitter antennas, each transmitter antenna being selective in turn for transmission of a corresponding source signal derived from the waveform generator, a plurality of receiver antennas, each receiver antenna coupled to a respective one receive path circuitry of a plurality of receive path circuitries identical to and including the receive path circuitry, the plurality of receiver antennas and their coupled respective receive path circuitries structured to operate in parallel, and a plurality of digital processing circuitries, each digital processing circuitry coupled to a respective one receive path circuitry of the plurality of receive path circuitries, the digital processing circuitries identical to and including the digital processing circuitry, the cancellation signal generator of each digital processing circuitry to operate as a number of leakage cancellers operating serially with each leakage canceller corresponding to one of the transmitter antennas, each cancellation signal generator of each digital processing circuitry to operate in parallel with the other cancellation signal generator of the other digital processing circuitries.

Optionally, in any of the preceding aspects, a further implementation of the aspect provides that each digital processing circuitry of the plurality digital processing circuitries comprises: residual leakage estimation circuitry coupled to receive a respective digital mixer output signal corresponding to each transmitter antenna to produce a residual leakage estimation corresponding to each transmitter antenna in the respective digital processing circuitry, second subtraction circuitry coupled to receive the respective digital mixer output corresponding to each transmitter antenna and the residual leakage estimation corresponding to each transmitter antenna to produce a radar output signal corresponding to each transmitter antenna in the respective digital processing circuitry, and wherein the subtraction circuitry subtracts the residual leakage estimation from the respective digital mixer output to produce the radar output signal corresponding to each transmitter antenna.

Optionally, in any of the preceding aspects, a further implementation of the aspect provides that the system further comprises: the at least one antenna being a plurality of transmitter antennas, each transmitter antenna being selective in turn for transmission of a corresponding source signal derived from the waveform generator, a plurality of receiver antennas, each receiver antenna selectively coupled to the receive path circuitry for signal reception in turn such that the each receiver antenna operates with each transmitter as a transmitter-receiver pair at selected times, and the cancellation signal generator of the digital processing circuitry to operate as a number of leakage cancellers operating serially with each leakage canceller corresponding to one transmitter-receiver pair of the transmitter-receiver pairs.

Optionally, in any of the preceding aspects, a further implementation of the aspect provides that the system further comprises the residual leakage estimation circuitry to operate as a number of residual leakage estimators to receive a digital mixer output signal corresponding to each transmitter-receiver pair to produce a residual leakage estimation corresponding to each transmitter-receiver pair in the digital processing circuitry; the second subtraction circuitry coupled to receive the digital mixer output corresponding to each transmitter-receiver pair and the residual leakage estimation corresponding to each transmitter-receiver pair to produce a radar output signal corresponding to each transmitter-receiver pair in the digital processing circuitry; and wherein the subtraction circuitry subtracts the residual leakage estimation from the respective digital mixer output to produce the radar output signal corresponding to each transmitter-receiver pair.

According to one aspect of the present disclosure, there is provided a system comprising: a waveform generator to generate a source signal for acoustic transmission from at least one acoustic transmitter; receive path circuitry coupled to receive an ingoing signal to process the ingoing signal after conversion from an ingoing acoustic signal; the receive path circuitry comprising: a mixer coupled to receive the source signal; the ingoing signal; and a leakage signal associated with the source signal; wherein the mixer produces a mixer output signal; an analog-to-digital converter that produces a digital mixer output signal that is based upon the mixer output signal; subtraction circuitry disposed electrically between the mixer and the analog-to-digital converter to subtract a leakage cancellation signal from the mixer output signal; and digital processing circuitry that comprises: a cancellation signal generator coupled to receive the digital mixer output signal to produce a digital cancellation signal; and a digital to analog converter coupled to receive the digital cancellation signal to produce the leakage cancellation signal.

Optionally, in any of the preceding aspects; another implementation of the aspect provides that the system includes a first switch coupled to receive the mixer output signal and coupled to the subtraction circuitry to provide the received mixer output signal to the subtraction circuitry; and a second switch coupled to receive the leakage cancellation signal and coupled to the subtraction circuitry to provide the received leakage cancellation signal to the subtraction circuitry; operation of the first and second switches coordinated to operate the subtraction circuitry in a working mode and in a calibration mode.

Optionally, in any of the preceding aspects, a further implementation of the aspect provides that the cancellation signal generator includes circuitry to convert a calibration signal, without compensation for signal leakage, to a first frequency domain calibration signal, convert a delta function to a second frequency domain calibration signal, generate a frequency domain leakage cancellation signal from the first and second frequency domain calibration signals, and convert the frequency domain leakage cancellation signal to the digital cancellation signal.

Optionally, in any of the preceding aspects, a further implementation of the aspect provides the system further comprising: residual leakage estimation circuitry coupled to receive the digital mixer output signal to produce a residual leakage estimation, second subtraction circuitry coupled to receive the digital mixer output and the residual leakage estimation to produce a detection output signal, and wherein the subtraction circuitry subtracts the residual leakage estimation from the digital mixer output to produce the detection output signal.

According to one aspect of the present disclosure, there is provided a method comprising: generating a source signal for wireless transmission from at least one antenna, receiving an ingoing radio frequency (RF) signal and processing the ingoing RF signal, the processing comprising: mixing the source signal, the ingoing RF signal, and a leakage signal associated with the source signal, producing a mixer output signal, subtracting a leakage cancellation signal from the mixer output signal, and producing a digital mixer output signal that is based upon the mixer output signal, wherein production of the leakage cancellation signal comprises: producing a digital cancellation signal by a cancellation signal generator coupled to receive the digital mixer output signal; and converting the digital cancellation signal to an analog signal to produce the leakage cancellation signal.

Optionally, in any of the preceding aspects, another implementation of the aspect provides that producing the digital cancellation signal includes converting a calibration signal, without compensating for signal leakage, to a first frequency domain calibration signal, converting a delta function to a second frequency domain calibration signal, generating a frequency domain leakage cancellation signal from the first and second frequency domain calibration signals; and converting the frequency domain leakage cancellation signal to the digital cancellation signal.

Optionally, in any of the preceding aspects, a further implementation of the aspect provides that the method includes estimating a residual leakage signal based on the digital mixer output signal; and producing a radar output signal from subtracting the estimated residual leakage signal from the digital mixer output signal.

Optionally, in any of the preceding aspects, a further implementation of the aspect provides that estimating the residual leakage signal includes generating a multiplicative factor from averaging the digital mixer output signal over time and applying the multiplicative factor to the digital mixer output signal to generate the estimated residual leakage signal.

Optionally, in any of the preceding aspects, a further implementation of the aspect provides that the method includes performing a sensing function with respect to the source signal based on the digital mixer output signal.

Optionally, in any of the preceding aspects, a further implementation of the aspect provides that performing the sensing function includes performing the sensing function as part of a frequency-modulated continuous wave radar.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in hardware and/or software in an embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, an application specific integrated circuit (ASIC), microprocessor, or other type of processor operating on a processing system, such as but not limited to a computer system, such as a personal signal processing device, personal computer, server, or other computer system, turning such processing system into a specifically programmed machine.

In various embodiments, a technique to cancel or reduce Tx-to-Rx leakage includes operation in the digital domain and in the analog domain. Such technique may be applied in a two step procedure. The first step is a mixed scheme. A leakage cancellation signal is generated digitally, converted to an analog signal, and is then subtracted in the analog domain from a signal received by the receiver. However, in contrast to methods that conduct cancellation at RF, the leakage cancelation can be performed at base-band, which may be applied at an output of a mixer mixing the associated received signal and the source signal for the transmitted signal. No additional mixers are needed, which can dramatically simplify radar transceiver design.

A second step, which may be implemented, is designed to further reduce residual leakage in the digital domain. Different from the first step, the leakage can be estimated adaptively from the received signal, and, hence, it can be performed online without interrupting the normal radar operation.

Figure 1:
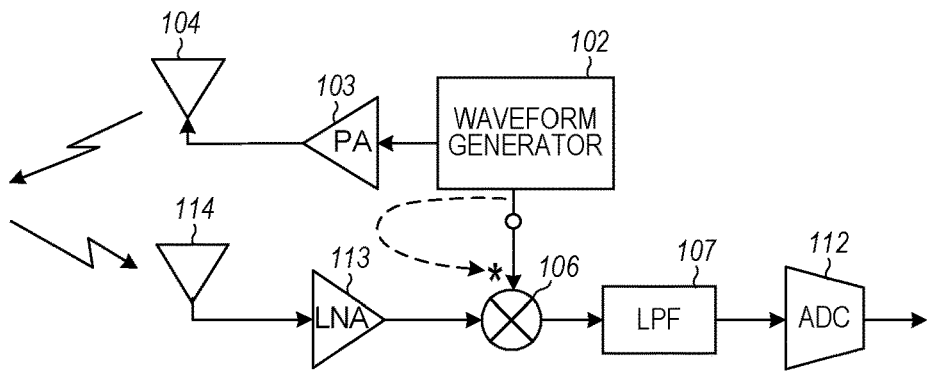
FIG. 1 is a block diagram of a typical frequency-modulated continuous wave radar.
Figure 2A:
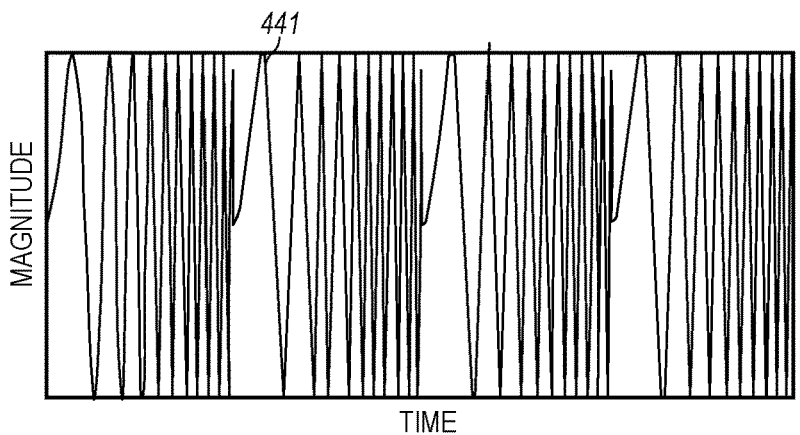
FIG. 2A is a representation of a signal that is transmitted repeatedly and periodically from a transmitter antenna of a frequency-modulated continuous wave radar, according to an example embodiment.
Figure 2B:
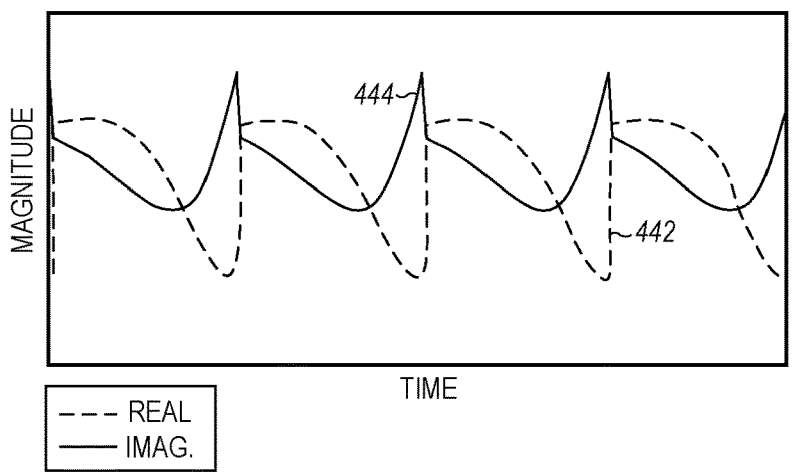
FIG. 2B illustrates that a typical leakage signal, observed at the output of a mixer of a frequency-modulated continuous wave radar system, is periodic with the same period as the transmitted waveform shown in FIG. 2A, according to an example embodiment.

FIG. 2A is a representation of a signal 441 that is transmitted repeatedly and periodically from a transmitter antenna of a FMCW radar. In FMCW radar, the transmitter and receiver operate concurrently, where in addition to the signal reflected from objects, the transmitted signal also leaks into the receiver directly. This leakage can be much stronger than the reflection signal. FIG. 2B illustrates that a typical leakage signal, observed at the output of a mixer of a FMCW radar system, is periodic with the same period as the associated transmitted waveform shown in FIG. 2A. FIG. 2B shows the real part 442 and the imaginary part 444 of the leakage signal.

Figure 3:
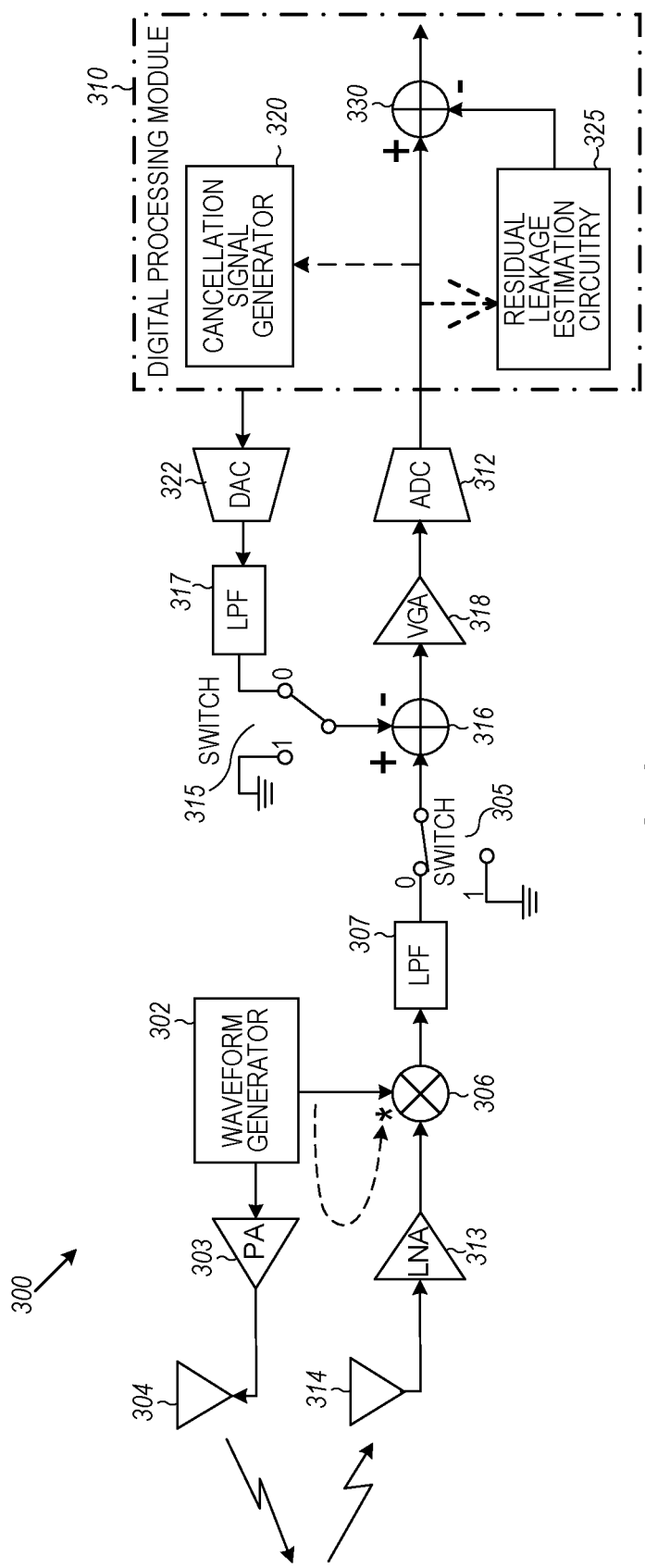
FIG. 3 is a block diagram of an example system having a frequency-modulated continuous wave radar system, according to an example embodiment.

FIG. 3 is a block diagram of an embodiment of an example system 300 having a FMWC radar system. System 300 includes a waveform generator 302, a transmitter antenna 304, a receiver antenna 314, a mixer 306, a cancellation signal generator 320, a digital-to-analog converter (DAC) 322, a subtraction circuitry 316, and an ADC 312. In operation, waveform generator 302 is arranged to generate a source signal and transmitter antenna 304 is coupled to waveform generator 302 to transmit the source signal. The source signal can be amplified by a PA 303 coupled between waveform generator 302 and transmitter antenna 304. For those systems that do not include such an amplifier, the signal provided to transmitter antenna 304 is the source signal effectively amplified by a factor of one.

Mixer 306, ADC 312, and subtraction circuitry 516-k can form a receive path circuitry coupled as a receiver chain to receiver antenna 314. The receive path circuitry is coupled to receive an ingoing radio frequency (RF) signal to process the ingoing RF signal in response to transmission of the source signal from transmitter antenna 304. The received signal can be received as a reflection from an object upon which the transmitted source signal impinges. The mixer 306 can be coupled to receive the source signal, the ingoing RF signal, and a leakage signal associated with the source signal, where mixer 306 produces a mixer output signal. The received signal in receive path circuitry can be amplified by a LNA 313 coupled between receiver antenna 314 and mixer 306. For those systems that do not include such a low noise amplifier, the signal provided to mixer 306 is the received signal effectively amplified by a factor of one. The leakage signal, associated with the source signal, can be a signal from transmitter antenna 304 directly to receiver antenna 314, providing a Tx-to-Rx leakage signal. The leakage signal may include leakage components from the circuitry, including waveform generator 302 and PA 303, associated with providing a signal to transmitter antenna 304. The leakage signal from such circuitry may become part of the signal in receiver antenna 314, LNA 313, and/or mixer 306 operated on at mixer 306. Mixer 306 has an output to provide the mixed signal as a mixer output signal.

ADC 312 can produce a digital mixer output signal that is based upon the mixer output signal of mixer 306 in the receive path circuitry. Subtraction circuitry 316 is disposed electrically between mixer 306 and ADC 312 to subtract a leakage cancellation signal from the mixer output signal in the receive path circuitry. The mixer output signal can be provided to subtraction circuitry 316 through a LPF 307 coupled between mixer 306 and subtraction circuitry 316, where LPF 307 filters the mixer output signal according to settings of LPF 307. For those systems that do not include such a low pass filter, the mixer output signal provided to subtraction circuitry 316 is essentially the full mixer output signal. The output of subtraction circuitry 316 can be a leakage-reduced mixer output signal, which can be provided to ADC 312 through a variable gain amplifier (VGA) 318 coupled between subtraction circuitry 316 and ADC 312. For those systems that do not include such a variable gain amplifier or an amplifier, the analog leakage-reduced mixer output signal provided to ADC 312 is essentially the leakage-reduced mixer output signal (essentially amplified with a gain of one). The digital leakage-reduced mixer output signal output from ADC 312 is provided to digital processing module 310.

Cancellation signal generator 320 and DAC 322 can form digital processing circuitry 310. Cancellation signal generator 320 can be coupled to receive the digital mixer output signal to produce a digital cancellation signal. DAC 322 can be coupled to receive the digital cancellation signal to produce the leakage cancellation signal, which is an analog leakage cancellation signal. The analog leakage cancellation signal can be synced with the output of mixer 306 to provide appropriate signals to subtraction circuitry 316. The timing of the mixer output can be determined by the timing of the transmitted source signal, which is controlled by the same system as generating the digital cancellation signal. The start of the transmission of the source signal and output of the digital cancellation signal may be correlated to be simultaneous. The leakage cancellation signal can be provided to subtraction circuitry 316-k through a LPF 317 coupled between DAC 322 and subtraction circuitry 316, where LPF 317 filters the leakage cancellation signal according to settings of LPF 317. For those systems that do not include such a low pass filter, the leakage cancellation signal provided to subtraction circuitry 316 is essentially the full leakage cancellation signal.

Cancellation signal generator 320 can include circuitry to convert a calibration signal, without compensation for signal leakage, to a first frequency domain calibration signal, convert a delta function to a second frequency domain calibration signal, generate a frequency domain leakage cancellation signal from the first and second frequency domain calibration signals, and convert the frequency domain leakage cancellation signal to the digital cancellation signal. Cancellation signal generator 320 can provide the digital cancellation signal for canceling leakage associated with a signal received at receiver antenna 314 at some time after converting the frequency domain leakage cancellation signal to the digital cancellation signal. Cancellation signal generator 320 can include access to a storage device to store the digital cancellation signal or parameters to generate the digital cancellation signal, and to provide the digital cancellation signal.

In addition to cancellation signal generator 320, digital processing module 310 can include residual leakage estimation circuitry 325 and a subtraction circuitry 330. Residual leakage estimation circuitry 325 can be coupled to receive the digital mixer output signal to produce a residual leakage estimation. Subtraction circuitry 330 can be coupled to receive the digital mixer output and the residual leakage estimation to produce a radar output signal. The subtraction circuitry 330 subtracts the residual leakage estimation from the digital mixer output to produce the radar output signal. Residual leakage estimation circuitry 325 can be structured to generate a multiplicative factor from an average of the digital mixer output signal over time and to apply the multiplicative factor to the digital mixer output signal to generate the residual leakage estimation.

Digital processing module 310 can be arranged to operate in a number of different modes. In one mode, digital processing module 310 provides the digital cancellation signal for use in cancelling leakage in a signal received at receiver antenna 314 during a sensing operation of system 300. This mode is a working mode. In another mode, digital processing module 310 operates to generate the digital cancellation signal. This other mode is a calibration mode. The two modes can be conducted by correlated operation of switches of system 300.

System 300 can include a first switch 305 coupled to subtraction circuitry 316 to operatively provide the mixer output signal to subtraction circuitry 316. System 300 can also include a second switch 315 coupled to subtraction circuitry 316 to operatively provide the leakage cancellation signal to subtraction circuitry 316. Operation of the first switch 305 and second switch 315 can be coordinated to operate subtraction circuitry 316 in a working model or in a calibration mode. VGA 318, coupled to subtraction circuitry 316 and to ADC 312, is adjustable such that, in the calibration mode, the variable gain amplifier is set to a low-gain relative to a gain setting of the variable gain amplifier in the working mode.

Circuitry of digital processing module 310 can be realized as one or more ASICs and/or one or more digital signal processors (DSPs). Such ASICs and/or DSPs can be structured to provide the generation of a cancellation signal residual leakage estimate in an optimized manner in that the digital signal processors may be made to operate, with instruction memory and/or data memory, specific to the executions of these functions.

System 300 can include circuitry to control a sensing function with respect to the generated source signal, based on the digital mixer output signal or the digital mixer output signal after reduction of residual leakage signal from the digital mixer output signal. The circuitry may be portions of one or more ASICs, one or more DSPs, and/or one or more processors. The architecture of system 300 may be used with other sensing systems.

System 300 can provide a two-step leakage cancellation scheme to avoid problems associated with conventional FMCW radars. The first step is performed at baseband in the analog domain. In this step, the majority of the leakage energy is cancelled, and the problem of saturation of an ADC is addressed. The second step can be carried out in the digital domain. It can be used to cancel residual leakage energy, which can allow for avoidance of "ghost" targets and masking of real targets.

As shown in FIG. 3, a leakage cancellation signal is generated in the digital domain. This digital signal can then be converted into an analog version by using DAC 322 and LPF 317. Analog subtraction circuitry 316 can be used to subtract the signal obtained through LPF 317 from the mixer output signal. A Tx-to-Rx leakage signal can be canceled or reduced, when the leakage cancellation signal is close to the true leakage signal. Note that in FIG. 3, two switches 305 and 315 along with VGA 318 are designed before ADC 312. When the radar is in the normal working mode, both switches 305 and 315 are set to position 0 shown in FIG. 3, where the mixer output and the leakage cancellation signal are selected as the analog subtraction circuitry 316 inputs. Position 1 of the two switches 305 and 315 can be connected to ground. Position 1 of the two switches 305 and 315 can be used in a calibration procedure, which can be used for the leakage estimation.

VGA 318 may be implemented using a fixed high-gain amplifier and a fixed low-gain amplifier. When the radar operates in the working mode with the switches in position 0, the strong leakage signal is cancelled or reduced, and, hence, the input to VGA 318 is weak. Therefore, the high-gain amplifier can be used in the normal working mode. In contrast, in a leakage calibration procedure, the low-gain amplifier may be used.

To effectively cancel or reduce the leakage, it is desirable to estimate the leakage accurately. A leakage calibration procedure is presented herein for this purpose. This procedure can be performed, when the radar is in an idle mode. The inventors have observed from a number of conventional systems that the TX-to-RX leakage is substantially consistent over time and for different hardware platforms. Therefore, dependent on the leakage cancellation requirement for an application, this leakage calibration procedure may also be performed at a lab environment, and the obtained leakage cancelation signal can be used for other platforms, such as commercial platforms.

A leakage calibration procedure for system 300 of FIG. 3 can begin with selecting a setting by choosing a low-gain amplifier for VGA 318 or a low gain level of a plurality of gain levels for VGA 318. At step "a" of the leakage calibration procedure, switch 305 is set to position 0, and switch 316 is set to position 1. The output of ADC 312 is operated on by a fast-Fourier transform (FFT) and the FFT of the output is recorded as $y_1(f)$. At step "b," switch 305 is set to position 1, and switch 315 to position 0. A delta function, i.e., [1, 0, 0, . . .], is transmitted to DAC 322, which provides an analog signal to LPF 317 that provides a filtered analog signal to subtraction circuitry 316. With switch 305 set to position 1, subtraction circuitry 316 conducts a subtraction operation with respect to zero and the filtered analog signal that is provided to cancellation signal generator 320 via VGA 318 and ADC 312. At cancellation signal generator 320, the output of ADC 312 is subjected to an FFT and the FFT of the output is recorded as $y_2(f)$.

At step "c," the cancellation signal generator 320 can compute a frequency cancellation signal, $c(f)$ as $$c(f) = \frac{y_1(f)y_2^*(f)}{|y_2(f)|^2 + \sigma^2}, \quad (1)$$

where $\sigma^2$ denotes the noise variance and * denotes complex conjugate. The cancellation signal generator 320 can apply an inverse fast-Fourier transform (IFFT) to $c(f)$, where the output of the IFFT can be used as the digital cancellation signal.

Figure 4:
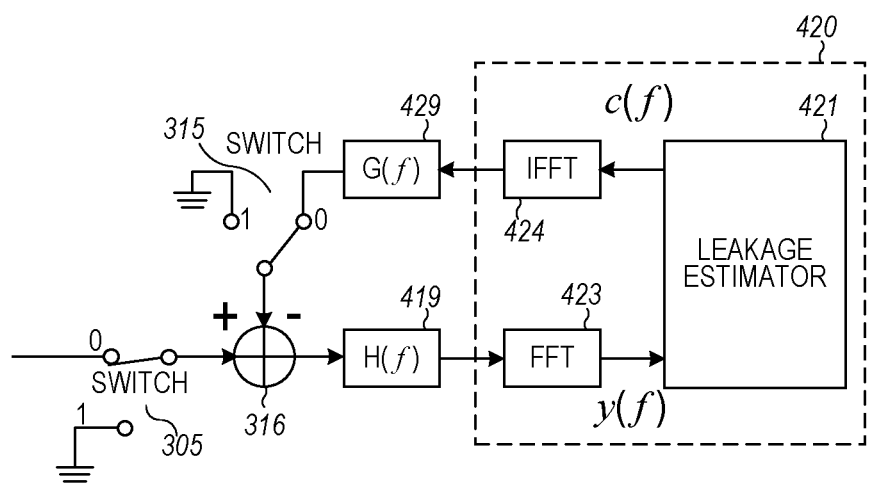
FIG. 4 is a block diagram of an equivalent leakage cancellation for the system of FIG. 3, according to an example embodiment.

To describe the leakage calibration procedure, a block diagram for an equivalent leakage cancellation for system 300 is shown in FIG. 4 with switch 315 at position 0 and switch 305 at position 0. In the frequency domain, cancellation signal generator 320 of FIG. 3 is represented by leakage calibration 420 having leakage estimator 421, FFT 423, and IFFT 424. $H(f)$ 419 represents the frequency response of the combination of VGA 316 and ADC 312, and $G(f)$ 429 represents the frequency response of the combination of DAC 322 and LPF 317. FFT 423 is applied to the output of ADC 312 and provides signal $y(f)$. IFFT 424 is applied to the cancellation signal, $c(f)$, generated by leakage estimator 421 with the output of the IFFT 424 provided to the input of DAC 322. The FFT and IFFT length can be determined by the period of the transmitted radar waveform. See, for example, FIG. 2A.

To verify this leakage calibration method, let $s(f)$ denote the leakage signal in the frequency domain. Then, by using the periodic property of the leakage signal, as demonstrated in FIG. 2B, $y_1(f)$ of step a can be modeled as:

$$y_1(f) = H(f)s(f) + H(f)e(f), \quad (2)$$

where $e(f)$ denotes noise. Similarly, $y_2(f)$ at step b can be given by:

$$y_2(f) = H(f)G(f). \quad (3)$$

Inserting equations (2) and (3) into $c(f)$ of equation (1), the leakage cancelation signal at the analog subtractor input 316 can be given by:

$$G(f)c(f) = \frac{|G(f)H(f)|^2}{|G(f)H(f)|^2 + \sigma^2}s(f) + \frac{|G(f)H(f)|^2}{|G(f)H(f)|^2 + \sigma^2}e(f). \quad (4)$$

Since the leakage signal is much stronger than noise, i.e., $|s(f)| \gg |e(f)|$ and $\sigma^2 \ll 1$, the following approximation can be obtained:

$$G(f)C(f) \approx S(f). \quad (5)$$

In other words, the leakage signal can be canceled or reduced significantly by using the leakage cancelation signal obtained using the steps above.

The above method can cancel the majority of the leakage energy, and can provide a solution to the ADC saturation problem. However, residual leakage signal may be still strong enough to generate "ghost" targets and/or to mask the true targets. To address this issue, a second-step leakage canceller may be implemented to further reduce the leakage signal.

As shown in FIG. 3, residual leakage estimation and cancellation, which is the second step when using the two-step leakage cancellation, is implemented in the digital domain. It is an online method, and, hence, won't interrupt the normal radar operation. By online, it is meant that it can be performed in real time. With respect to signal processing, by real time is meant completing some signal/data processing within a time that is sufficient to keep up with an external process, such as performing detection operations of a radar.

In residual leakage estimation circuitry 325 of system 300 of FIG. 3, the residual leakage signal can first be estimated. Note that the leakage signal is periodic, since the leakage signal is associated with the source signal transmitted. It may be assumed that the leakage signal is unchanged, while the radar signal reflected from objects varies over time due to movement of the objects being detected or movement of the radar. By averaging the measurements over a long time, for example a few minutes, an estimate of the residual leakage signal can be obtained. After averaging the received signal, the leakage signal can be kept the same, while, the radar return signal is essentially cancelled out due to time-varying phases. Let y(t) be the time-domain signal at the input of residual leakage estimation circuitry 325 at a certain period. Then, the leakage signal p(t) can be estimated using following approximate relationship:

$$p(t) \leftarrow (1-\rho)Pp(t) + \rho y(t) \quad (6)$$

where $\rho$ denotes a forgetting factor, and is a small number, for example, $10^{-3}$. The term Pp(t) on the right side represents an older estimate of the leakage signal. When a new chirp signal y(t) is received, a weighted average of Pp(t) (the old p(t)) and y(t) can be computed. The result can be used as an updated leakage estimate, i.e., the p(t) on the left side of relationship (6). The process can keep updating p(t) using the relationship (6). Equivalently, p(t) can be taken as an average of y(t) over the past time, but with different weights. Then, the leakage signal can be further reduced by subtracting p(t) from y(t). However, under some conditions, the second-step leakage canceller provided by residual leakage estimation circuitry 325 in FIG. 3 can be omitted. Residual leakage estimation circuitry 325 can be omitted from the architecture of system 300, or digital processing module 310 may include logic and/or a switch to operatively switch residual leakage estimation circuitry 325 off and on.

Various modifications to the architecture of system 300 can be made to implement the leakage cancellation provided in system 300 to other systems. The leakage cancellation techniques can be extended to multiple antenna radar systems, including phased array, and multiple-input multiple-output (MIMO) radar. It can also be used in other sensing systems, such as sonar, ultrasonic, and other sensing systems that generate a probe and detect a signal in response to the generation of the probe. In addition, the radar transceiver system in FIG. 3 can be modified. For example, a range compensation high-pass filter (HPF) can be used before or after VGA 318. With the inclusion of the HPF, the same leakage cancellation method can be applied.

Figure 5:
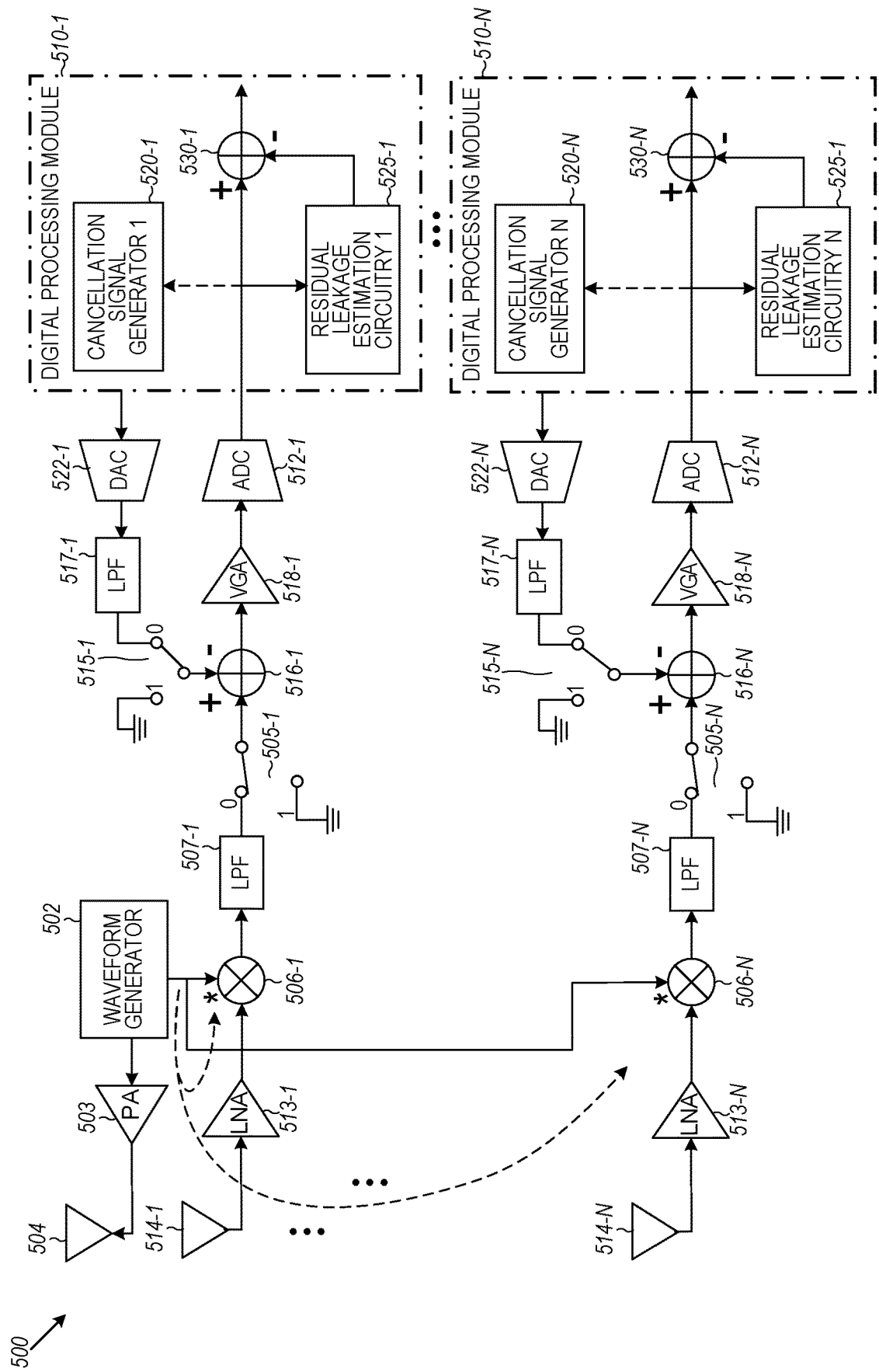
FIG. 5 is a block diagram of an example system having a frequency-modulated continuous wave radar system in a phased array configuration, according to an example embodiment.

FIG. 5 is a block diagram of an embodiment of an example system 500 having a FMCW radar system in a phased array configuration. System 500 includes a waveform generator 502, a transmitter antenna 504, receiver antennas 514-1 . . . 514-N, mixers 506-1 . . . 506-N, cancellation signal generators 520-1 . . . 520-N, DACs 522-1 . . . 522-N, subtraction circuitries 516-1 . . . .N, and ADC 512-1 . . . 512-N. In operation, waveform generator 502 is arranged to generate a source signal for wireless transmission, and transmitter antenna 504 is coupled to waveform generator 502 to transmit the source signal. The source signal can be amplified by a PA 503 coupled between waveform generator 502 and transmitter antenna 504. For those systems that do not include such a power amplifier, the signal provided to transmitter antenna 504 is the source signal effectively amplified by a factor of one.

For each k, k=1 . . . N, mixer 506-k, ADC 512-k, and subtraction circuitry 516-k can form a receive path circuitry k coupled as a receiver chain to a respective one receiver antenna 514-k. Each receive path circuitry k is coupled to receive an ingoing radio frequency (RF) signal to process the ingoing RF signal in response to transmission of the source signal from transmitter antenna 504. The received signal can be received as a reflection from an object upon which the transmitted source signal impinges. Each mixer 506-k can be coupled to receive the source signal, the ingoing RF signal, and a leakage signal associated with the source signal, where mixer 506-k produces a mixer output signal. Each received signal in receive path circuitry k can be amplified by a LNA 513-k coupled between receiver antenna 514-k and mixer 506-k. For those systems that do not include such a low noise amplifier, the signal provided to mixer 506-k is the received signal effectively amplified by a factor of one. The leakage signal, associated with the source signal, can be a signal from transmitter antenna 504 directly to receiver antenna 514-k. The leakage signal may include leakage components from the circuitry, including waveform generator 502 and PA 503, associated with providing a signal to transmitter antenna 504. The leakage signal from such circuitry may become part of the signal in receiver antenna 5 14-k, LNA 513-k, and/or mixer 506-k operated on at mixer 506-k. Mixer 506-k has an output to provide the mixed signal as a mixer output signal.

For each k, k=1 . . . N, ADC 512-k can produce a digital mixer output signal that is based upon the mixer output signal of mixer 506 -k in receive path circuitry k. Subtraction circuitry 516-k is disposed electrically between mixer 506 -k and ADC 512-k to subtract a leakage cancellation signal from the mixer output signal in receive path circuitry k. The mixer output signal can be provided to subtraction circuitry 516-k through a LPF 507-k coupled between mixer 506-k and subtraction circuitry 516-k, where LPF 507-k filters the mixer output signal according to settings of LPF 507-k. For those systems that do not include such a low pass filter, the mixer output signal provided to subtraction circuitry 516-k is essentially the full mixer output signal. The output of subtraction circuitry 516-k can be a leakage-reduced mixer output signal, which can be provided to ADC 512-k through a variable gain amplifier (VGA) 518-k coupled between subtraction circuitry 516-k and ADC 512-k. For those systems that do not include such a variable gain amplifier or an amplifier, the analog leakage-reduced mixer output signal provided to ADC 512-k is essentially the leakage-reduced mixer output signal (essentially amplified with a gain of one). The digital leakage-reduced mixer output signal output from ADC 512-k is provided to digital processing module 510-k.

For each k, k=1 ... N, cancellation signal generator 520-k and DAC 522-k can form digital processing circuitry k. Cancellation signal generator 520-k can be coupled to receive the digital mixer output signal to produce a digital cancellation signal. DAC 522-k can be coupled to receive the digital cancellation signal to produce the leakage cancellation signal, which is an analog leakage cancellation signal. The analog leakage cancellation signal can be synced with the output of mixer 506-k to provide appropriate signals to subtraction circuitry 516-k. The timing of the mixer output can be determined by the timing of the transmitted source signal, which is controlled by the same system generating the digital cancellation signal. The start of the transmission of the source signal and output of the digital cancellation signal may be correlated to be simultaneous. The leakage cancellation signal can be provided to subtraction circuitry 516-k through a LPF 517-k coupled between DAC 522-k and subtraction circuitry 516-, where LPF 517-k filters the leakage cancellation signal according to settings of LPF 517-k. For those systems that do not include such a low pass filter, the leakage cancellation signal provided to subtraction circuitry 516-k is essentially the full leakage cancellation signal.

Cancellation signal generator 520-k can include circuitry to convert a calibration signal, without compensation for signal leakage, to a first frequency domain calibration signal, convert a delta function to a second frequency domain calibration signal, generate a frequency domain leakage cancellation signal from the first and second frequency domain calibration signals, and convert the frequency domain leakage cancellation signal to the digital cancellation signal. Cancellation signal generator 520-k can provide the digital cancellation signal for canceling leakage associated with a signal received at receiver antenna 514-k at some time after converting the frequency domain leakage cancellation signal to the digital cancellation signal. Cancellation signal generator 520-k can include access to a storage device to store the digital cancellation signal or parameters to generate the digital cancellation signal, and to provide the digital cancellation signal.

In addition to cancellation signal generator 520-k, digital processing module 510-k can include residual leakage estimation circuitry 525-k and subtraction circuitry 530-k. Residual leakage estimation circuitry 525-k can be coupled to receive the digital mixer output signal to produce a residual leakage estimation. Subtraction circuitry 530-k can be coupled to receive the digital mixer output and the residual leakage estimation to produce a radar output signal. The subtraction circuitry 530-k subtracts the residual leakage estimation from the digital mixer output to produce the radar output signal. Residual leakage estimation circuitry 525 -k can be structured to generate a multiplicative factor from an average of the digital mixer output signal over time and to apply the multiplicative factor to the digital mixer output signal to generate the residual leakage estimation.

For each k, k=1 ... N, digital processing module 510-k can be arranged to operate in a number of different modes. In one mode, digital processing module 510-k provides the digital cancellation signal for use in cancelling leakage in a signal received at receiver antenna 514-k during a sensing operation of system 500. This mode is a working mode. In another mode, digital processing module 510-k operates to generate the digital cancellation signal. This other mode is a calibration mode. The two modes can be conducted by correlated operation of switches of system 500.

For each k, system 500 can include a first switch 505-k coupled to subtraction circuitry 516-k to operatively provide the mixer output signal to subtraction circuitry 516-k. System 500 can also include a second switch 515-k coupled to subtraction circuitry 516-k to operatively provide the leakage cancellation signal to subtraction circuitry 516-k. Operation of the first switch 505-k and second switch 515-k can be coordinated to operate subtraction circuitry 516-k in a working model or in a calibration mode. VGA 518-k, coupled to subtraction circuitry 516-k and to ADC 512-k, is adjustable such that, in the calibration mode, the variable gain amplifier is set to a low-gain relative to a gain setting of the variable gain amplifier in the working mode.

System 500 can include circuitry to control a sensing function with respect to the generated source signal, based on the digital mixer output signal or the digital mixer output signal after reduction of residual leakage signal from the digital mixer output signal from each digital processing module 510-k, k=1 ... N. The circuitry may be portions of one or more ASICs, one or more DSPs, and/or one or more processors. The architecture of system 500 may be used with other sensing systems.

System 500 can provide a two-step leakage cancellation scheme to avoid problems associated with conventional FMCW radars. The first step is performed at baseband in the analog domain. In this step, the majority of the leakage energy is cancelled, and the problem of saturation of an ADC is addressed. The second step can be carried out in the digital domain. It can be used to cancel residual leakage energy, which can allow for avoidance of "ghost" targets and masking of real targets. For each k, k=1 ... N, each receive path circuitry k coupled with respective digital processing circuitry k can be operated in working mode and calibration mode as discussed with respect to system 300 of FIG. 3 applying equations (1) and (6).

The N receive path circuitries can be identical to each other in layout, and the N digital processing circuitries can be identical to each other in layout. System 500 may be arranged with a single transmitter antenna and N receiving antennas, where each receiving antenna is coupled to a respective one receive path circuitry as a receiver chain, the receiver chains operating in parallel. Each receiver chain is coupled to a respective digital processing circuitry, which has a leakage canceller. The leakage cancellers of the digital processing circuitries operate in parallel.

Figure 6:
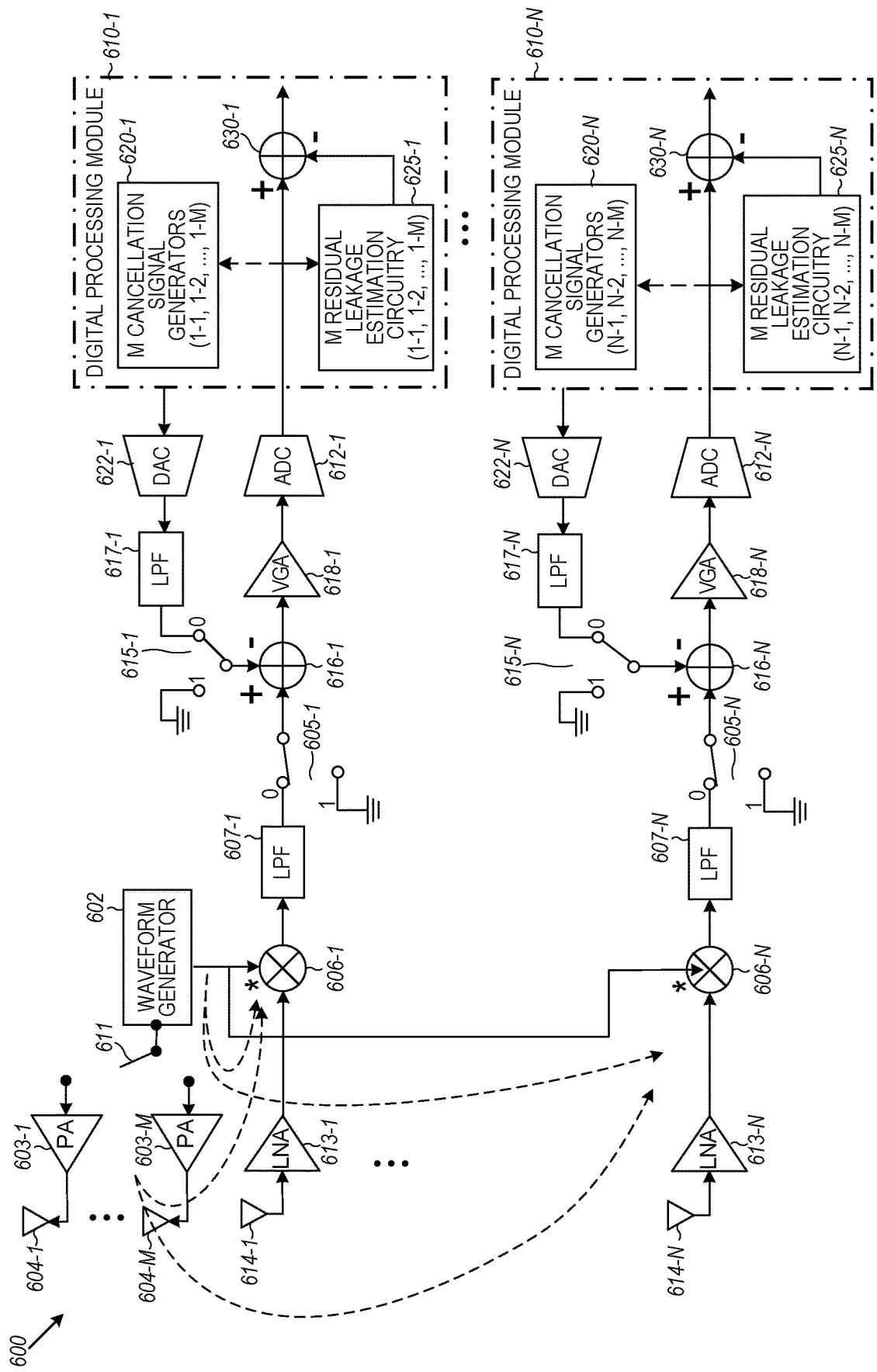
FIG. 6 is a block diagram of an example system having a frequency-modulated continuous wave radar system in a multiple-input multiple-output radar configuration, according to an example embodiment.

FIG. 6 is a block diagram of an embodiment of an example system 600 having a FMCW radar system in a MIMO radar configuration based on transmitter antenna switching. System 600 includes a waveform generator 602, transmitter antennas 604-1 . . . 604-M, receiver antennas 614-1 . . . 614-N, mixers 606-1 . . . 606-N, cancellation signal generators 620-1 . . . 620-N, DACs 622-1 . . . 622-N, subtraction circuitries 616-1 . . . N, and ADC 612-1 . . . 612-N. In operation, waveform generator 602 is arranged to generate a source signal for wireless transmission, and transmitter antennas 604-1 . . . 604-M are coupled to waveform generator 602 and are selected for transmission in turn to transmit the source signal. A transmitter can be selected from among transmitter antennas 604-1 . . . 604-M by a switch 611. The source signal can be amplified by each of PA 603-1 . . . PA 603-M when a corresponding one of the transmitter antennas 604-1 . . . 604-M is selected. PA 603-1 . . . PA 603-M are coupled between waveform generator 602 and transmitter antennas 604-1 . . . 604-M, respectively. For those systems that do not include such a power amplifier, the signal provided to transmitter antennas 604-1 . . . 604-M is the source signal effectively amplified by a factor of one.

For each k, k=1 ... N, mixer 606-k, ADC 612-k, and subtraction circuitry 616-k can form a receive path circuitry k coupled as a receiver chain to a respective one receiver antenna k. Each receive path circuitry k is coupled to receive an ingoing radio frequency (RF) signal to process the ingoing RF signal in response to transmission of the source signal from transmitter antennas 604-1 ... 604-M at their respective selected periods. The received signal can be received as a reflection from an object upon which the transmitted source signal impinges. Each mixer 606-k can be coupled to receive the source signal, the ingoing RF signal, and a leakage signal associated with the source signal, where mixer 606-k produces a mixer output signal. Each received signal in receive path circuitry k can be amplified by a LNA 613-k coupled between receiver antenna 614-k and mixer 606-k. For those systems that do not include such a low noise amplifier, the signal provided to mixer 606-k is the received signal effectively amplified by a factor of one. The leakage signal, associated with the source signal, can be a signal from transmitter antenna 604 directly to receiver antenna 614-k. The leakage signal may include leakage components from the circuitry, including waveform generator 602 and PA 603-1 ... PA 603-M, associated with providing a signal to transmitter antenna 604. The leakage signal from such circuitry may become part of the signal in receiver antenna 614-k, LNA 614-k, and/or mixer 606-k operated on at mixer 606-k. Mixer 606-k has an output to provide the mixed signal as a mixer output signal.

For each k, k=1 ... N, ADC 612-k can produce a digital mixer output signal that is based upon the mixer output signal of mixer 606-k in receive path circuitry k. Subtraction circuitry 616-k is disposed electrically between mixer 606-k and ADC 612-k to subtract a leakage cancellation signal from the mixer output signal in receive path circuitry k. The mixer output signal can be provided to subtraction circuitry 616-k through a LPF 607-k coupled between mixer 606-k and subtraction circuitry 616-k, where LPF 607-k filters the mixer output signal according to settings of LPF 607-k. For those systems that do not include such a low pass filter, the mixer output signal provided to subtraction circuitry 616-k is essentially the full mixer output signal. The output of subtraction circuitry 616-k can be a leakage-reduced mixer output signal, which can be provided to ADC 612-k through a variable gain amplifier (VGA) 618-k coupled between subtraction circuitry 616-k and ADC 612-k. For those systems that do not include such a variable gain amplifier or an amplifier, the analog leakage-reduced mixer output signal provided to ADC 612-k is essentially the leakage-reduced mixer output signal (essentially amplified with a gain of one). The digital leakage-reduced mixer output signal output from ADC 612-k is provided to digital processing module 610-k.

For each k, k=1 ... N, cancellation signal generator 620-k and DAC 622-k can form digital processing circuitry. Each cancellation signal generator 620-k of each digital processing circuitry k can be structured to operate as a number of leakage cancellers operating serially with each leakage canceller corresponding to one of the transmitter antennas 604-1 ... 604-M. Each cancellation signal generator 620-k can be arranged as M cancellation signal generators with system 600 having M transmitting antennas. Each cancellation signal generator 620-k of each digital processing circuitry k can be structured to operate in parallel with the other cancellation signal generator 620-j of the other digital processing circuitries j, j≠k. Cancellation signal generator 620-k can be coupled to receive the digital mixer output signal to produce a digital cancellation signal corresponding to each selected transmitter antenna. DAC 622-k can be coupled to receive the digital cancellation signal to produce the leakage cancellation signal, which is an analog leakage cancellation signal. The analog leakage cancellation signal can be synced with the output of mixer 606-k to provide appropriate signals to subtraction circuitry 616-k. The timing of the mixer output can be determined by the timing of the transmitted source signal, which is controlled by the same system as generating the digital cancellation signal. The start of the transmission of the source signal and output of the digital cancellation signal may be correlated to be simultaneous. The leakage cancellation signal can be provided to subtraction circuitry 616-k through a LPF 617-k coupled between DAC 622-k and subtraction circuitry 616-k, where LPF 617-k filters the leakage cancellation signal according to settings of LPF 617-k. For those systems that do not include such a low pass filter, the leakage cancellation signal provided to subtraction circuitry 616-k is essentially the full leakage cancellation signal.

For operation of each leakage canceller within cancellation signal generator 620-k, or serial operation of cancellation signal generator 620-k as a set of leakage cancellers, cancellation signal generator 620-k can include circuitry to convert a calibration signal, without compensation for signal leakage, to a first frequency domain calibration signal; convert a delta function to a second frequency domain calibration signal; generate a frequency domain leakage cancellation signal from the first and second frequency domain calibration signals; and convert the frequency domain leakage cancellation signal to the digital cancellation signal for each leakage canceller. Cancellation signal generator 620-k can provide the digital cancellation signals for canceling leakage associated with signals received at receiver antenna 614-k at some time after converting the frequency domain leakage cancellation signal to the digital cancellation signal. Cancellation signal generator 620-k can include access to a storage device to store the digital cancellation signals or parameters to generate the digital cancellation signals, and to provide the respective digital cancellation signals associated with the transmitter antennas 604-1 ... 604-M at the appropriate selected periods.

In addition to cancellation signal generator 620-k, digital processing module 610-k can include a residual leakage estimation circuitry 625-k and a subtraction circuitry 630-k. Each residual leakage estimation circuitry 625-k of each digital processing circuitry k can be structured to operate as a number of residual leakage estimators operating serially with each residual leakage estimator corresponding to one of the transmitter antennas 604-1 ... 604-M. For operation of each residual leakage estimator within residual leakage estimation circuitry 625-k, or serial operation of residual leakage estimation circuitry 625-k as a set of residual leakage estimators, residual leakage estimation circuitry 625-k can be coupled to receive the digital mixer output signal to produce a residual leakage estimation to correspond to each of transmitter antennas 604-1 ... 604-M. Subtraction circuitry 630-k can be coupled to receive the digital mixer output and the residual leakage estimation to produce a radar output signal associated with each transmitter antennas 604-1 ... 604-M from digital module 610-k. The subtraction circuitry 630-k subtracts the residual leakage estimations, produced seriall, from the digital mixer output to produce the radar output signal from digital module 610-k. Residual leakage estimation circuitry 625-k can be structured to generate a multiplicative factor from an average of the digital mixer output signal over time and to apply the multiplicative factor to the digital mixer output signal to generate the residual leakage estimation for each residual leakage estimator of residual leakage estimation circuitry 625-k.

For each k, k=1 . . . N, digital processing module 610-k can be arranged to operate in a number of different modes. In one mode, digital processing module 610-k provides the digital cancellation signal for use in cancelling leakage in a signal received at receiver antenna 614-k during a sensing operation of system 600. This mode is a working mode. In another mode, digital processing module 610-k operates to generate the digital cancellation signal. This other mode is a calibration mode. The two modes can be conducted by correlated operation of switches of system 600.

For each k, system 600 can include a first switch 605-k coupled to subtraction circuitry 616-k to operatively provide the mixer output signal to subtraction circuitry 616-k. System 600 can also include a second switch 615-k coupled to subtraction circuitry 616-k to operatively provide the leakage cancellation signal to subtraction circuitry 616-k. Operation of the first switch 605-k and second switch 615-k can be coordinated to operate subtraction circuitry 616-k in a working model or in a calibration mode for each transmitter antenna 604-1 . . . 604-M. VGA 618-k, coupled to subtraction circuitry 616-k and to ADC 612-k, is adjustable such that, in the calibration mode, the variable gain amplifier is set to a low-gain relative to a gain setting of the variable gain amplifier in the working mode.

System 600 can include circuitry to control a sensing function with respect to the generated source signal, based on the digital mixer output signal or the digital mixer output signal after reduction of residual leakage signal from the digital mixer output signal associated with each transmitter antennas 604-1 . . . 604-M. The circuitry may be portions of one or more ASICs, one or more DSPs, and/or one or more processors. The architecture of system 600 may be used with other sensing systems.

System 600 can provide a two-step leakage cancellation scheme to avoid problems associated with conventional FMCW radars. The first step is performed at baseband in the analog domain. In this step, the majority of the leakage energy is cancelled, and the problem of saturation of an ADC saturation is addressed. The second step is carried out in the digital domain. It can be used to cancel residual leakage energy, which can allow for avoidance of "ghost" targets and masking of real targets. For each k, k=1 . . . N, each receive path circuitry k coupled with respective digital processing circuitry k can be operated in working mode and calibration mode, with respect to each transmitter antennas 604-1 . . . 604-M, as discussed with respect to system 300 of FIG. 3 applying equations (1) and (6) for signals received corresponding to selected operation of transmitter antennas 604-1 . . . 604-M.

The N receive path circuitries can be identical to each other in layout of the architecture of system 600, and the N digital processing circuitries can be identical to each other in layout. System 600 may be arranged with M transmitter antennas and N receiving antennas, where each transmitter antenna is selected to operate in turn, and each receiving antenna is coupled to a respective one receive path circuitry as a receiver chain, with the receiver chains operating in parallel. Each receiver chain is coupled to a respective digital processing circuitry. Each digital processing circuitry has with a cancellation leakage canceller structure to operate as M leakage cancellers operating serially within the cancellation leakage canceller, where each leakage canceller corresponds to a respective one of the M transmitter antennas. The cancellation leakage cancellers of the digital processing circuitries coupled to different receiver chains operate in parallel.

Figure 7:
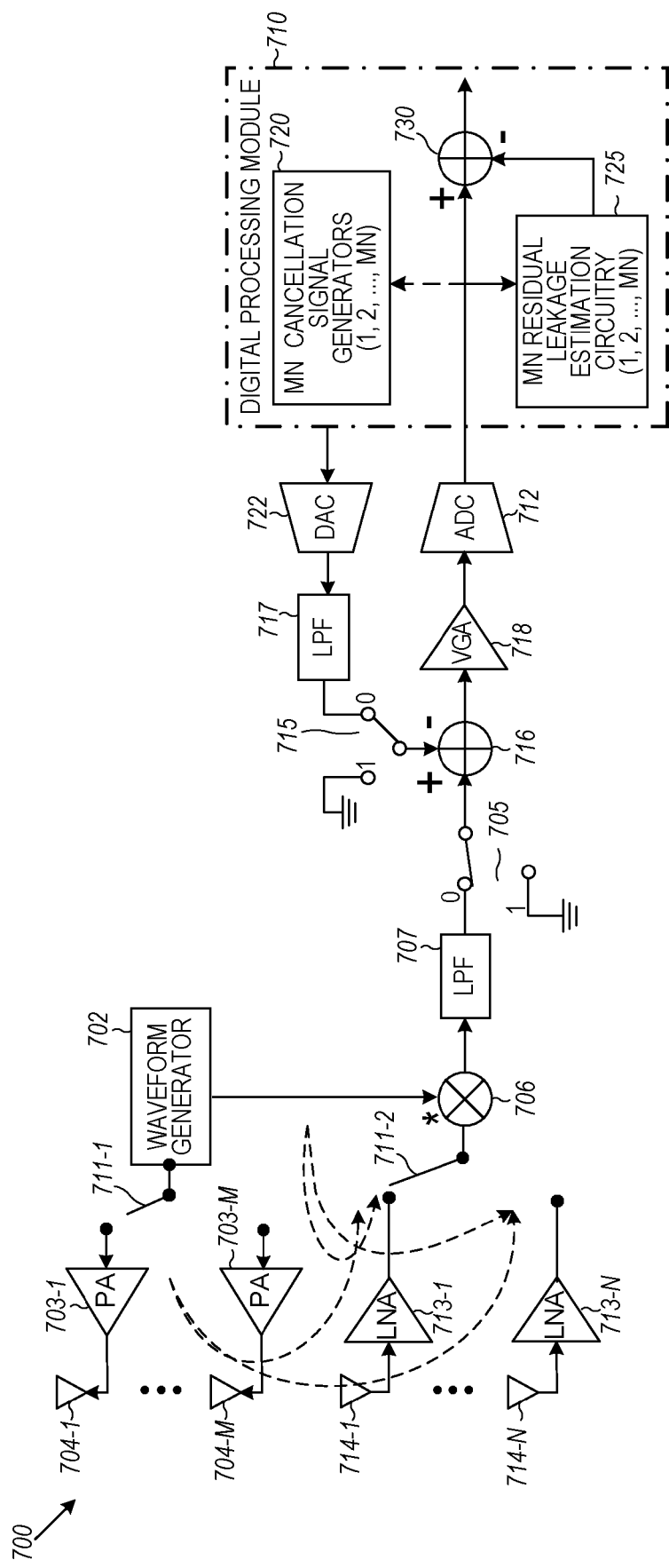
FIG. 7 is a block diagram of an example system having a frequency-modulated continuous wave radar system in a multiple-input multiple-output radar configuration, according to an example embodiment.

FIG. 7 is a block diagram of an embodiment of an example system having a frequency-modulated continuous wave radar system in a multiple-input multiple-output radar configuration FIG. 7 is a block diagram of an embodiment of an example system 700 having a FMCW radar system in a MIMO radar configuration based on transmitter antenna and receiver antenna switching. System 700 includes a waveform generator 702, transmitter antennas 704-1 . . . 704-M, receiver antennas 714-1 . . . 714-N, mixers 706, cancellation signal generators 720, DAC 722, subtraction circuitry 716, and ADC 712. In operation, waveform generator 702 is arranged to generate a source signal for wireless transmission, and transmitter antennas 704-1 . . . 704-M are coupled to waveform generator 702 and are selected for transmission in turn to transmit the source signal. A transmitter can be selected from among transmitter antennas 704-1 . . . 704-M by a switch 711-1. The source signal can be amplified by each of PA 703-1 . . . PA 703-M when a corresponding one of the transmitter antennas 704-1 . . . 704-M is selected. PA 703-1 . . . PA 703-M are coupled between waveform generator 702 and transmitter antennas 704-1 . . . 704-M, respectively. For those systems that do not include such a power amplifier, the signal provided to transmitter antennas 704-1 . . . 704-M is the source signal effectively amplified by a factor of one.

Mixer 706, ADC 712, and subtraction circuitry 716 can form receive path circuitry coupled as a receiver chain to a selected one receiver antenna of receiver antennas 714-1 . . . 714-N by a switch 711-2. Each receiver antenna of the receiver antennas 714-1 . . . 714-N can be selectively coupled to the receive path circuitry for signal reception in turn such that the each receiver antenna operates with each transmitter antenna of the transmitter antennas 704-1 . . . 704-M as a transmitter-receiver (Tx, Rx) pair at selected times. The receive path circuitry is coupled to receive an ingoing radio frequency (RF) signal to process the ingoing RF signal in response to transmission of the source signal from transmitter antennas 704-1 . . . 704-M during their selected transmission periods. The received signal can be received as a reflection from an object upon which the transmitted source signal impinges. Mixer 706 can be coupled to receive the source signal, the ingoing RF signal, and a leakage signal associated with the source signal, where mixer 706 produces a mixer output signal. Each received signal in the receive path circuitry can be amplified by a LNA 713-1 . . . 713-N coupled between an associated receiver antenna of receiver antennas 714-1 . . . 714-N and mixer 706 upon selection by switch 711-2. For those systems that do not include such a low noise amplifier, the signal provided to mixer 706 is the received signal effectively amplified by a factor of one. Leakage signals, associated with the source signal, can be signals from transmitter antennas 704-1 . . . 704-M directly to receiver antennas 714-1 . . . 714-N. The leakage signals may include leakage components from the circuitry, including waveform generator 702 and PA 703-1 ... 703-M, associated with providing a signal to transmitter antennas 704-1 . . . 704-M. Leakage signals from such circuitry may become part of the signal in receiver antennas 714-1 . . . 714-N, LNA 713-1 . . . 713-N, and/or mixer 706 operated on at mixer 706. Mixer 706 has an output to provide the mixed signal as a mixer output signal.

ADC 712 can produce a digital mixer output signal that is based upon the mixer output signal of mixer 706 in the receive path circuitry. Subtraction circuitry 716 is disposed electrically between mixer 706 and ADC 712 to subtract a leakage cancellation signal from the mixer output signal in the receive path circuitry. The mixer output signal can be provided to subtraction circuitry 716 through a LPF 707 coupled between mixer 706 and subtraction circuitry 716, where LPF 707 filters the mixer output signal according to settings of LPF 707. For those systems that do not include such a low pass filter, the mixer output signal provided to subtraction circuitry 716 is essentially the full mixer output signal. The output of subtraction circuitry 716 can be a leakage-reduced mixer output signal, which can be provided to ADC 712 through a variable gain amplifier (VGA) 718 coupled between subtraction circuitry 716 and ADC 712. For those systems that do not include such a variable gain amplifier or an amplifier, the analog leakage-reduced mixer output signal provided to ADC 712 is essentially the leakage-reduced mixer output signal (essentially amplified with a gain of one). The digital leakage-reduced mixer output signal output from ADC 712 is provided to digital processing module 710.

Cancellation signal generator 720 and DAC 722 can form digital processing circuitry. Cancellation signal generator 720 can be structured to operate as a number of leakage cancellers operating serially with each leakage canceller corresponding to one of transmitter antennas 704-1 . . . 704-M and one of receiver antennas 714-1 . . . 714-N, that is, to one (Tx, Rx) antenna pair. With M transmitting antennas and N receiving antennas, the number of (Tx, Rx) antenna pairs is the multiplicative product MN. Cancellation signal generator 720 can be arranged as MN leakage cancellers. Cancellation signal generator 720 can be structured to operate serially as MN leakage cancellers, each one of the MN leakage cancellers corresponding to one (Tx, Rx) antenna pair. Cancellation signal generator 720 can be coupled to receive the digital mixer output signal to produce a digital cancellation signal corresponding to each selected (Tx, Rx) antenna pair. DAC 722 can be coupled to receive the digital cancellation signal to produce the leakage cancellation signals, which are analog leakage cancellation signals, one for each selected (Tx,Rx) antenna pair. Analog leakage cancellation signals can be synced with the output of mixer 706 to provide appropriate signals to subtraction circuitry 716. The timing of the mixer output can be determined by the timing of the transmitted source signal with respect to the selected transmitter and the selected receiver, which is controlled by the same system as generating the digital cancellation signals. The start of the transmission of the source signal and output of the digital cancellation signal may be correlated to be simultaneous. The leakage cancellation signals in their appropriate time periods can be provided to subtraction circuitry 716 through a LPF 717 coupled between DAC 722 and subtraction circuitry 716, where LPF 717 filters the leakage cancellation signal according to settings of LPF 717. For those systems that do not include such a low pass filter, the leakage cancellation signal provided to subtraction circuitry 716 is essentially the full leakage cancellation signal.

For operation of each leakage canceller within cancellation signal generator 720, or serial operation of cancellation signal generator 720-k as a set of leakage cancellers, cancellation signal generator 720 can include circuitry to convert a calibration signal, without compensation for signal leakage, to a first frequency domain calibration signal; convert a delta function to a second frequency domain calibration signal; generate a frequency domain leakage cancellation signal from the first and second frequency domain calibration signals; and convert the frequency domain leakage cancellation signal to the digital cancellation signal for each (Tx, Rx) pair. Cancellation signal generator 720 can provide the digital cancellation signal for canceling leakage associated with signals received at receiver antenna 714-k with respect to transmission from transmitter antenna 704-j at some time after converting the frequency domain leakage cancellation signal to the digital cancellation signal. Cancellation signal generator 720 can include access to a storage device to store the digital cancellation signals or parameters to generate the digital cancellation signals, and to provide the appropriate digital cancellation signals associated with the respective (Tx, Rx) pair.

In addition to cancellation signal generator 720, digital processing module 710 can include residual leakage estimation circuitry 725 and subtraction circuitry 730-k. Residual leakage estimation circuitry 725 can be structured to operate as a number of residual leakage estimators operating serially with each residual leakage estimator corresponding to one (Tx, Rx) antenna pair. For operation of each residual leakage estimator within residual leakage estimation circuitry 725, or serial operation of residual leakage estimation circuitry 725 as a set of residual leakage estimators, residual leakage estimation circuitry 725 can be coupled to receive the digital mixer output signal to produce a residual leakage estimation. Subtraction circuitry 730 can be coupled to receive the digital mixer output and the residual leakage estimation to produce a radar output signal. The subtraction circuitry 730 subtracts the residual leakage estimation for (Tx, Rx) antenna pair from the digital mixer output in the selected periods to produce the radar output signal. The selected periods can correspond to the coordinated selection of switches 711-1 and 711-2. Residual leakage estimation circuitry 725 can be structured to generate a multiplicative factor from an average of the digital mixer output signal over time and to apply the multiplicative factor to the digital mixer output signal to generate the residual leakage estimation for each residual leakage estimator of residual leakage estimation circuitry 725 at their selected periods.

Digital processing module 710 can be arranged to operate in a number of different modes. In one mode, digital processing module 710 provides the digital cancellation signal for use in cancelling leakage in a signal received at receiver antenna 714-k corresponding to transmission from a transmitter antenna 704-j during a sensing operation of system 700. This mode is a working mode. In another mode, digital processing module 710 operates to generate the digital cancellation signals for the (Tx, Rx) antenna pairs. This other mode is a calibration mode. The two modes can be conducted by coordinated operation of switches of system 700 in the receive path circuitry and coupling the receive path circuitry to the digital processing circuitry along with switches 711-1 and 711-2.

System 700 can include a first switch 705 coupled to subtraction circuitry 716 to operatively provide the mixer output signal to subtraction circuitry 716. System 700 can also include a second switch 715 coupled to subtraction circuitry 716 to operatively provide the leakage cancellation signal to subtraction circuitry 716. Operation of the first switch 705 and second switch 715 can be coordinated to operate subtraction circuitry 716 in a working model or in a calibration mode. VGA 718, coupled to subtraction circuitry 716 and to ADC 712, is adjustable such that, in the calibration mode, the variable gain amplifier is set to a low-gain relative to a gain setting of the variable gain amplifier in the working mode.

System 700 can include circuitry to control a sensing function with respect to the generated source signal, based on the digital mixer output signal or the digital mixer output signal after reduction of residual leakage signal from the digital mixer output signal. The circuitry may be portions of one or more ASICs, one or more DSPs, and/or one or more processors. The architecture of system 700 may be used with other sensing systems.

System 700 can provide a two-step leakage cancellation scheme to avoid problems associated with conventional FMCW radars. The first step is performed at baseband in the analog domain. In this step, the majority of the leakage energy is cancelled, and the problem of saturation of an ADC saturation is addressed. The second step may be carried out in the digital domain. It can be used to cancel residual leakage energy, which can allow for avoidance of "ghost" targets and masking of real targets. The receive path circuitry coupled with the digital processing circuitry can be operated in working mode and calibration mode as discussed with respect to system 300 of FIG. 3 applying equations (1) and (6) for signals received corresponding to selected operation of (Tx, Rx) antenna pairs.

System 700 may be arranged with M transmitter antennas and N receiving antennas, providing a total of MN (Tx, Rx) antenna pairs. Each transmitter antenna can be selected to operate in turn, and each receiving antenna can be coupled to a shared receive path circuitry as a receiver chain, with each receiver antenna selected for signal reception in turn. The receiver chain is coupled to a digital processing circuitry, which can include MN leakage cancellers operating serially, where each MN leakage canceller corresponds to one (Tx, Rx) antenna pair.

The architecture of system 300 of FIG. 3 can be modified to other work in other sensing situations. For example, system 300 can be modified into a system having an acoustic probing system by replacing transmitter antenna 304 with an acoustic transmitter, which generates an acoustic output signal from an electrical input signal, and replacing receiving antenna 314 with an acoustic receiver, which generates an electrical output signal from an acoustic input signal. A system, having an acoustic detection system, can comprise a waveform generator in conjunction with receive path circuitry and digital processing circuitry. The waveform generator can be structured to generate a source signal for acoustic transmission from at least one acoustic transmitter. The receive path circuitry can be coupled to receive an ingoing signal to process the ingoing signal after conversion from an ingoing acoustic signal. The receive path circuitry can include a mixer, an analog-to-digital converter, and subtraction circuitry.

The mixer can be coupled to receive the source signal, the ingoing signal, and a leakage signal associated with the source signal, where the mixer produces a mixer output signal. The analog-to-digital converter can produce a digital mixer output signal that is based upon the mixer output signal. The subtraction circuitry can be disposed electrically between the mixer and the analog-to-digital converter to subtract a leakage cancellation signal from the mixer output signal.

The leakage cancellation signal can be generated from the digital processing circuitry that includes a cancellation signal generator and a digital to analog converter. The cancellation signal generator can be coupled to receive the digital mixer output signal and to produce a digital cancellation signal. The digital to analog converter coupled to receive the digital cancellation signal to produce the leakage cancellation signal.

The system having an acoustic probing system can include a first switch coupled to receive the mixer output signal and coupled to the subtraction circuitry to provide the received mixer output signal to the subtraction circuitry, and a second switch coupled to receive the leakage cancellation signal and coupled to the subtraction circuitry to provide the received leakage cancellation signal to the subtraction circuitry. Operation of the first and second switches can be coordinated to operate the subtraction circuitry in a working mode and in a calibration mode. Such a system can include the cancellation signal generator to include circuitry to convert a calibration signal, without compensation for signal leakage, to a first frequency domain calibration signal, and to convert a delta function to a second frequency domain calibration signal. A frequency domain leakage cancellation signal can be generated from the first and second frequency domain calibration signals, and the frequency domain leakage cancellation signal can be converted to the digital cancellation signal. The receive path circuitry coupled with the digital processing circuitry of the acoustic based detection system can be operated in working mode and calibration mode as discussed with respect to system 300 of FIG. 3 applying equations (1) and (6).

The system having an acoustic probing system can include residual leakage estimation circuitry coupled to receive the digital mixer output signal to produce a residual leakage estimation. The residual leakage estimation can be provided to a second subtraction circuitry coupled to receive the digital mixer output along with the residual leakage estimation to produce a detection output signal. The subtraction circuitry can subtract the residual leakage estimation from the digital mixer output to produce the detection output signal.

Figure 8:
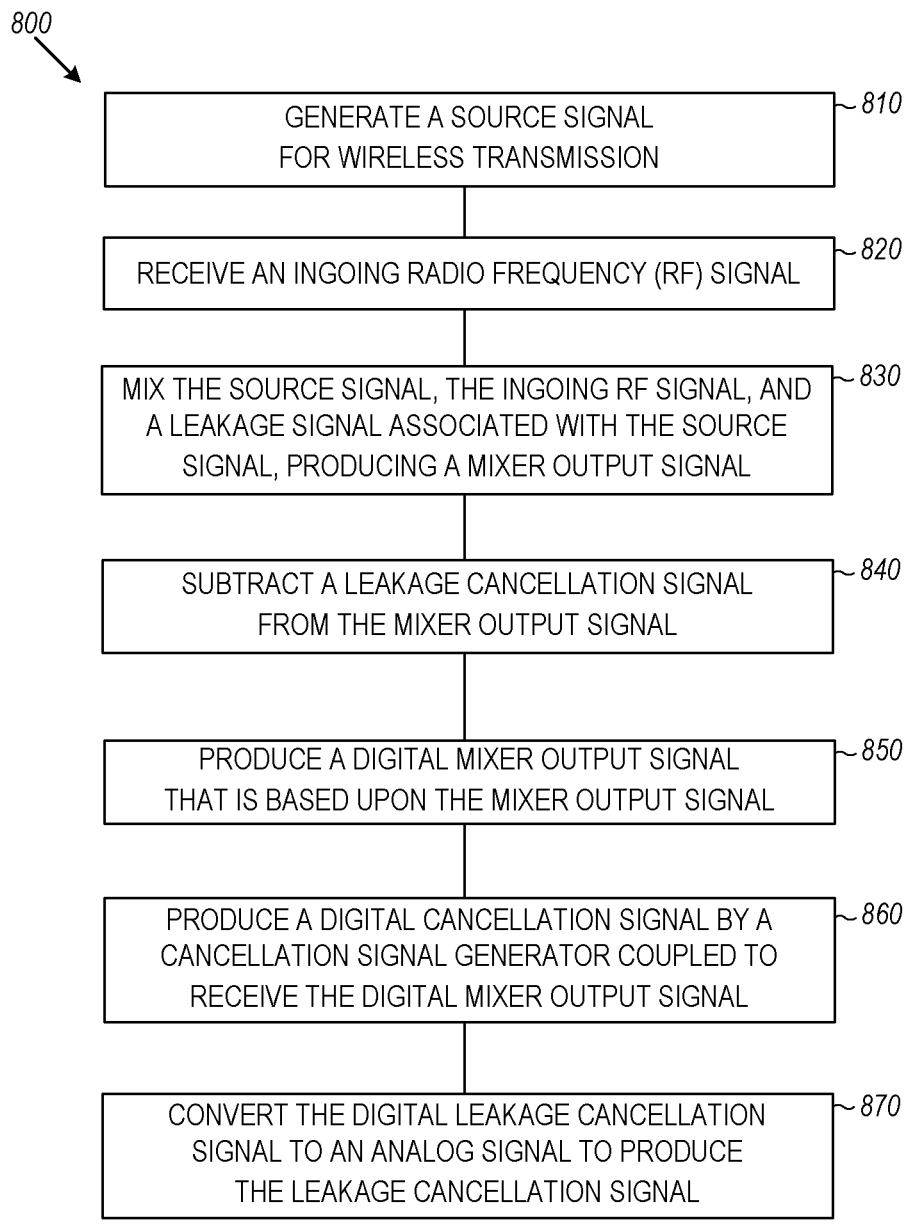
FIG. 8 is a flow diagram of features of an example method to cancel a leakage signal, according to an example embodiment.

FIG. 8 is a flow diagram of features of an embodiment of an example method of providing leakage cancellation to a received signal. At 810, a source signal is generated for wireless transmission. The wireless transmission can be from at least one antenna. At 820, an ingoing radio frequency (RF) signal is received. The ingoing RF signal can be processed using a procedure that comprises operations in the analog domain and in the digital domain. At 830, the source signal, the ingoing RF signal, and a leakage signal associated with the source signal are mixed, producing a mixer output signal. At 840, a leakage cancellation signal is subtracted from the mixer output signal. At 850, a digital mixer output signal that is based upon the mixer output signal is produced.

Production of the leakage cancellation signal can comprise operations in the digital domain with conversion of the results into the analog domain. At 860, a digital cancellation signal is produced by a cancellation signal generator coupled to receive the digital mixer output signal. Producing the digital cancellation signal can include converting a calibration signal, without compensating for signal leakage, to a first frequency domain calibration signal; converting a delta function to a second frequency domain calibration signal; generating a frequency domain leakage cancellation signal from the first and second frequency domain calibration signals; and converting the frequency domain leakage cancellation signal to the digital cancellation signal. At 870, the digital cancellation signal is converted to an analog signal to produce the leakage cancellation signal. The digital cancellation signal may be generated in a calibration mode and converted to an analog signal to produce the leakage cancellation signal in a working mode. Operation in two modes may be facilitated with coordinated use of switches.

Variations of method 800 or methods similar to method 800 can include a number of different embodiments that may or may not be combined depending on the application of such methods and/or the architecture of systems in which such methods are implemented. Such methods can include estimating a residual leakage signal based on the digital mixer output signal; and producing a radar output signal from subtracting the estimated residual leakage signal from the digital mixer output signal. Estimating the residual leakage signal can include generating a multiplicative factor from averaging the digital mixer output signal over time and applying the multiplicative factor to the digital mixer output signal to generate the estimated residual leakage signal.

Variations of method 800 or methods similar to method 800 can include performing a sensing function with respect to the source signal based on the digital mixer output signal. The sensing function can be performed as part of a frequency-modulated continuous wave radar. In various embodiments, the frequency-modulated continuous wave radar may be structured as a phased array system, a transmitter antenna switching based MIMO radar, or a transmitter antenna and receiver antenna switching based MIMO. The techniques of the method can be applied to sensing functions using acoustic probing.

In various embodiments, a number of the tasks executed in method 800 or in similar methods can be realized in a set of integrated circuits. The set of integrated circuits can comprise one or more integrated circuits. Each integrated circuit can be structured as one or more die in a package having input and output pins, which may be referred to as nodes. The set of integrated circuits can be one or more ASICs, which are specifically designed for a system including a detection system, such as a FMCW radar, extensions of a FMCW radar, an acoustic system, or other detection system using a wireless probe signal, as taught herein. The set of integrated circuits may include digital signal processors (DSPs) and associated data storages to record data signals and perform digital signal processing such as, but not limited to, executing fast Fourier transforms and inverse fast Fourier transforms.

Figure 9:
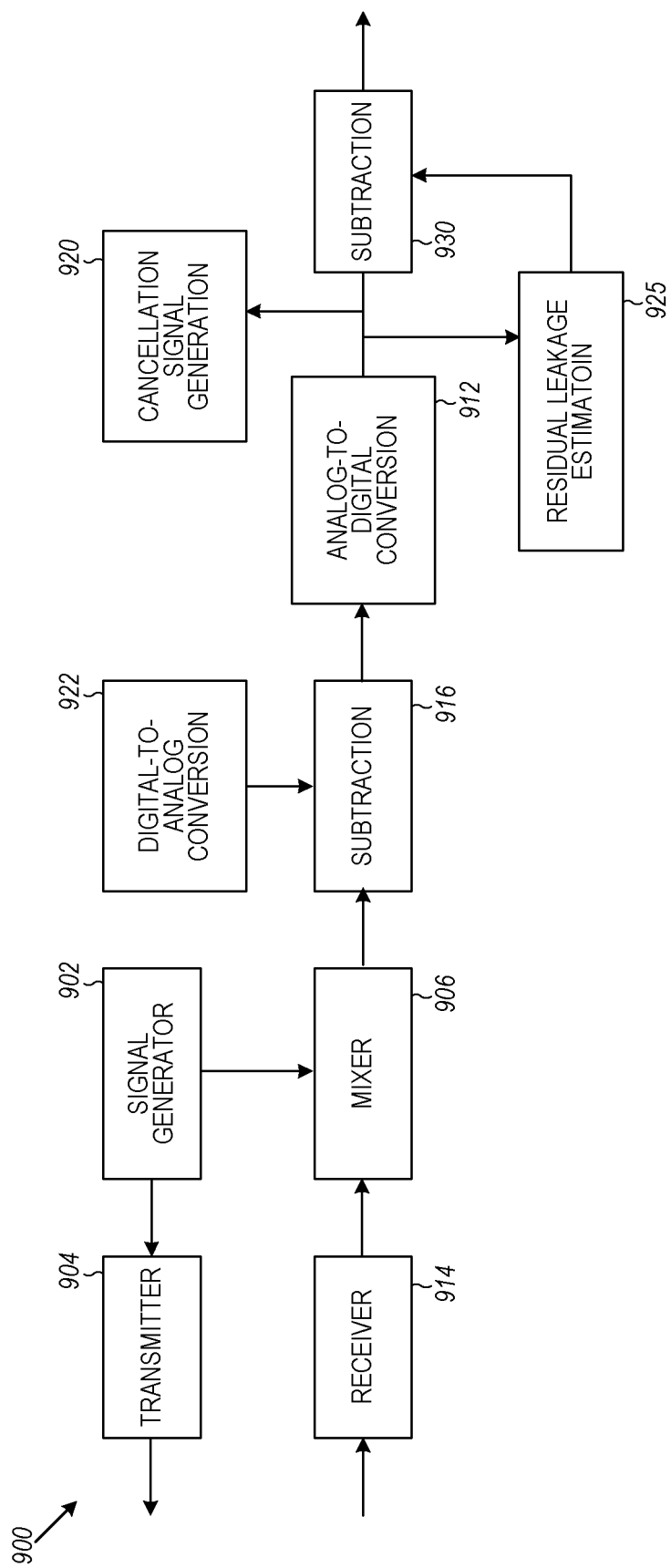
FIG. 9 is a block diagram of an example system having a detection system, according to an example embodiment.

FIG. 9 is a block diagram of an embodiment of an example system 900 having a detection system. System 900 can include a signal generator means 902 for generating a source signal for wireless transmission. Wireless transmission can be realized by a transmitter means 904. Transmitter means 904 may include at least one antenna. An ingoing signal can be received by receiver means 914 for processing. The processing can comprise mixing the source signal, the ingoing signal, and a leakage signal associated with the source signal by a mixer means 906 for mixing signals, which produces a mixer output signal. A subtraction means 916 for subtracting signals can be arranged to subtract a leakage cancellation signal from the mixer output signal. Analog-to-digital conversion means 912 for converting analog signals to digital signals can be implemented to produce a digital mixer output signal that is based upon the mixer output signal.

A digital cancellation signal generation means 920 for generating a digital cancellation signal generator is coupled to receive the digital mixer output signal. Generating the digital cancellation signal by digital cancellation signal generator means 920 can include converting a calibration signal, without compensating for signal leakage, to a first frequency domain calibration signal; converting a delta function to a second frequency domain calibration signal; generating a frequency domain leakage cancellation signal from the first and second frequency domain calibration signals; and converting the frequency domain leakage cancellation signal to the digital cancellation signal. The digital cancellation signal can be converted to an analog signal to produce the leakage cancellation signal by a digital-to-analog conversion means 920 for converting digital signals to analog signals.

System 900 can also include a residual leakage estimation means 925 for estimating a residual leakage, which may be based on the digital mixer output signal, to generate an estimated residual leakage signal. A subtraction means 930 for subtracting signals can be arranged to produce a detection output signal from subtracting the estimated residual leakage signal from the digital mixer output signal. Residual leakage estimation means 925 can estimate the residual leakage signal from a procedure including generating a multiplicative factor from averaging the digital mixer output signal over time and applying the multiplicative factor to the digital mixer output signal to generate the estimated residual leakage signal. From the output of the subtraction means 930 for subtracting signals, a sensing function can be performed with respect to the source signal based on the digital mixer output signal. The sensing function can include a sensing function as part of a frequency-modulated continuous wave radar.

Figure 10:
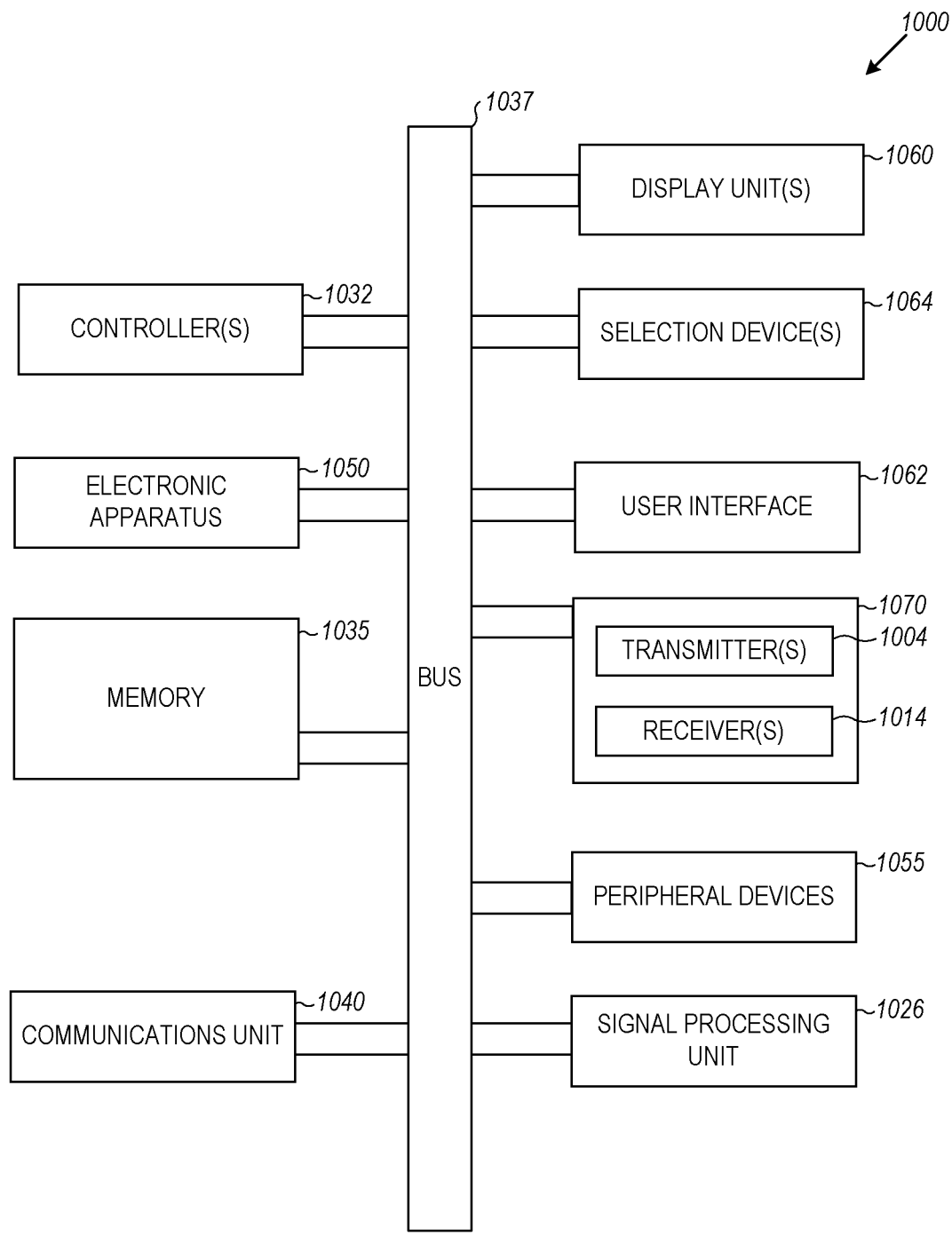
FIG. 10 is a block diagram illustrating circuitry for systems having a detection system with components to cancel or reduce a leakage signal, according to an example embodiment.

FIG. 10 is a block diagram of features of an embodiment of an example system 1000 having a detection unit 1070. Detection unit 1070, having one or more transmitters and one or more receivers, along with the components of system 1000 may be implemented to reduce or cancel leakage signals in received signals from transmitting a probe signal. Detection unit 1070 may be implemented as a FMCW radar or other detection unit, according to the teachings herein. System 1000 may be integrated into an automobile, a smart phone, a smart watch, other terminal device, and other devices that have functions including detection applications including but not limited to short range radar applications.

System 1000 may also include a number of components such as control circuitry 1032, memory 1035, communications unit 1040, signal processing unit 1045, electronic apparatus 1050, peripheral devices 1055, display unit(s) 1060, user interface 1062, and selection device(s) 1064. Control circuitry 1032 can be realized in one or more ASICs. Control circuitry 1032 may be realized in one or more DSPs. Control circuitry 1032 may be structured to provide, among other things, adjustment to gain levels and other variable parameters to operate detection unit 1070 and can be part of a digital processing module associated with detection unit 1070. Depending on the architecture and designed functions of system 1000, control circuitry 1032 can be realized as one or more processors, where such processors may operate as a single processor or a group of processors. Processors of the group of processors may operate independently depending on an assigned function. In controlling operation of the components of system 1000 to execute schemes associated the functions for which system 1000 is designed, control circuitry 1032 can direct access of data to and from a database.

System 1000 can include control circuitry 1032, memory 1035, and communications unit 1040 arranged to operate as a processing unit to control management of detection unit 1070 and to perform operations on data signals collected by detection unit 1070. For example, control circuitry 1032, memory 1035, and communications unit 1040 can be arranged to determine one or more characteristics for an object detected by detection unit 1070 from a set including distance, velocity, and direction associated with the object and provide the data to display unit(s) 1060, memory 1035, and/or to systems external to system 1000 via communications unit 1040. Depending on the application, communications unit 1040 may use combinations of wired communication technologies and wireless technologies.

Memory 1035 can include a database having information and other data such that system 1000 can operate on data to perform functions of system 1000. Signal processing unit 1045 may be distributed among the components of system 1000 including memory 1035 and/or electronic apparatus 1050.

System 1000 can also include a bus 1037, where bus 1037 provides electrical conductivity among the components of system 1000. Bus 1037 may include an address bus, a data bus, and a control bus, where each may be independently configured. Bus 1037 may be realized using a number of different communication mediums that allows for the distribution of components of system 1000. Use of bus 1037 can be regulated by control circuitry 1032. Bus 1037 may be operable as part of a communications network to transmit and receive signals including data signals and command and control signals.

In various embodiments, peripheral devices 1055 may include drivers to provide voltage and/or current input to detection unit 1070, additional storage memory and/or other control devices that may operate in conjunction with control circuitry 1032 and/or memory 1035. Display unit(s) 1060 can be arranged with a screen display that can be used with instructions stored in memory 1035 to implement user interface 1062 to manage the operation of detection unit 1070 and/or components distributed within system 1000. Such a user interface can be operated in conjunction with communications unit 1040 and bus 1037. Display unit(s) 1060 can include a video screen or other structure to visually project data/information and images. System 1000 can include a number of selection devices 1064 operable with user interface 1062 to provide user inputs to operate signal processing unit 1045 or its equivalent. Selection device(s) 1064 can include a touch screen or a selecting device operable with user interface 1062 to provide user inputs to operate signal processing unit 1045 or other components of system 1000.

In various embodiments, a system can include a set of processors and a set of associated non-transitory machine-readable storage devices to perform tasks for which the system is structured. The system may include a detection system that can be operated, using the set of processors along with instructions stored in the set of non-transitory machine-readable storage devices, including cancelling or reducing a leakage signal, as taught herein. Such set of non-transitory machine-readable storage devices can comprise instructions stored thereon, which, when performed by a machine, cause the machine to direct and/or perform operations, the operations comprising one or more features similar to or identical to features of methods and techniques described with respect to method 800, variations thereof, and/or features of other methods taught herein such as associated with FIGS. 1-10. The physical structures of such instructions may be operated on by one or more processors. Further, a machine-readable storage device, herein, is a physical device that stores data represented by physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices. The machine-readable device may be a machine-readable medium such as memory 1035 of FIG. 10. While memory 1035 is shown as a single memory, terms such as "memory," "machine-readable medium," "machine-readable device," "machine-readable storage device," "memory module," and similar terms should be taken to include all forms of storage media, either in the form of a single medium (or device) or multiple media (or devices), in all forms. For example, such structures can be realized as centralized database(s), distributed database(s), associated caches, and servers; one or more storage devices, such as storage drives (including but not limited to electronic, magnetic, and optical drives and storage mechanisms), and one or more instances of memory devices or modules (whether main memory; cache storage, either internal or external to a processor; or buffers). Terms such as "memory," "memory module," "machine-readable medium," and "machine-readable device," shall be taken to include any tangible non-transitory medium which is capable of storing or encoding a sequence of instructions for execution by the machine and that cause the machine to direct or perform any one of the methodologies taught herein. The term "non-transitory" used in reference to a " machine-readable device," "medium," "storage medium," "device," or "storage device" expressly includes all forms of storage drives (optical, magnetic, electrical, etc.) and all forms of memory devices (e.g., DRAM, Flash (of all storage designs), SRAM, MRAM, phase change, etc., as well as all other structures designed to store data of any type for later retrieval.

As noted, the machine-readable non-transitory media, such as computer-readable non-transitory media, includes all types of computer readable media, including magnetic storage media, optical storage media, flash media and solid state storage media. It should be understood that software can be installed in and sold with a system having a FMCW radar or other sensing systems having transmitters and receivers operable with a probe signal. Alternatively the software can be obtained and loaded into the device having the sensing system, including obtaining the software through physical medium or distribution system, including, for example, from a server owned by the software creator or from a server not owned but used by the software creator. The software can be stored on a server for distribution over the Internet, for example.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A system comprising:
   a waveform generator to generate a source signal for wireless transmission from at least one antenna;
   receive path circuitry coupled to receive an ingoing radio frequency (RF) signal that is a reflection of the source signal from an object and configured to process the ingoing RF signal, the receive path circuitry comprising:
   a mixer coupled to receive the ingoing RF signal and a high frequency signal from the waveform generator, wherein the mixer produces a down_converted mixer output signal;

an analog-to-digital converter that produces a digital mixer output signal that is based upon the mixer output signal;
subtraction circuitry disposed electrically between the mixer and the analog-to-digital converter to subtract a leakage cancellation signal from the mixer output signal;
a digital to analog converter configured to produce the leakage cancellation signal;
a first switch configured to selectively couple one of the received mixer output signal or ground to the subtraction circuitry; and
a second switch configured to selectively couple one of the leakage cancellation signal or ground to the subtraction circuitry.

2. The system of claim 1, wherein the system includes a variable gain amplifier coupled between the subtraction circuitry and the analog-to-digital converter, wherein the variable gain amplifier comprises a fixed high-gain amplifier and a fixed low-gain amplifier.

3. The system of claim 1, wherein the system includes a low pass filter coupled between the mixer and the subtraction circuitry, wherein the low pass filter filters the mixer output signal.

4. The system of claim 1, wherein the system includes a low pass filter coupled between the digital to analog converter and the subtraction circuitry, wherein the low pass filter filters the leakage cancellation signal.

5. The system of claim 1, wherein components of the system are structured to produce a frequency-modulated continuous wave radar signal.

6. The system of claim 1, further comprising:
one or more additional receive path circuitries identical to the receive path circuitry;
wherein the receive path circuitry and the one or more additional receive path circuitries are structured to operate in parallel with respect the source signal generated by the waveform generator.

7. The system of claim 1, wherein the system further comprises:
the at least one antenna being a plurality of transmitter antennas, each transmitter antenna being selective in turn for transmission of a corresponding source signal derived from the waveform generator; and
a plurality of receiver antennas, each receiver antenna coupled to a respective one receive path circuitry of a plurality of receive path circuitries identical to and including the receive path circuitry, the plurality of receiver antennas and their coupled respective receive path circuitries structured to operate in parallel.

8. The system of claim 1, wherein the system further comprises:
the at least one antenna being a plurality of transmitter antennas, each transmitter antenna being selective in turn for transmission of a corresponding source signal derived from the waveform generator; and
a plurality of receiver antennas, each receiver antenna selectively coupled to the receive path circuitry for signal reception in turn such that each of the plurality of receiver antenna operates with each transmitter as a transmitter-receiver pair at selected times.

9. A method comprising:
generating a source signal for wireless transmission from at least one antenna;
receiving an ingoing radio frequency (RF) signal that is a reflection of the source signal from an object and processing the ingoing RF signal, the processing comprising:
mixing the ingoing RF signal, producing a down converted mixer output signal;
subtracting a leakage cancellation signal from the mixer output signal by a subtraction circuitry disposed electrically between a mixer and an analog-to-digital converter;
producing a digital mixer output signal that is based upon the mixer output signal;
converting a digital signal to an analog signal to produce the leakage cancellation signal;
selectively couple the received mixer output signal or ground to the subtraction circuitry; and
selectively couple the leakage cancellation signal or ground to the subtraction circuitry.

\* \* \* \* \*